United States Patent
Matsuo et al.

(10) Patent No.: US 9,813,709 B2
(45) Date of Patent: Nov. 7, 2017

(54) INTRA-PREDICTION ENCODING METHOD, INTRA-PREDICTION DECODING METHOD, INTRA-PREDICTION ENCODING APPARATUS, INTRA-PREDICTION DECODING APPARATUS, PROGRAM THEREFOR AND RECORDING MEDIUM HAVING PROGRAM RECORDED THEREON

(71) Applicant: NIPPON TELEGRAPH AND TELEPHONE CORPORATION, Tokyo (JP)

(72) Inventors: Shohei Matsuo, Yokosuka (JP); Masaaki Matsumura, Yokosuka (JP); Hiroshi Fujii, Yokohama (JP); Seishi Takamura, Yokosuka (JP); Atsushi Shimizu, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 270 days.

(21) Appl. No.: 14/430,851

(22) PCT Filed: Sep. 26, 2013

(86) PCT No.: PCT/JP2013/076073
§ 371 (c)(1),
(2) Date: Mar. 24, 2015

(87) PCT Pub. No.: WO2014/050971
PCT Pub. Date: Apr. 3, 2014

(65) Prior Publication Data
US 2015/0245021 A1    Aug. 27, 2015

(30) Foreign Application Priority Data
Sep. 28, 2012    (JP) .................................. 2012-217888

(51) Int. Cl.
*H04N 19/105*    (2014.01)
*H04N 19/11*    (2014.01)
(Continued)

(52) U.S. Cl.
CPC ........... *H04N 19/105* (2014.11); *H04N 19/11* (2014.11); *H04N 19/136* (2014.11);
(Continued)

(58) Field of Classification Search
CPC .... H04N 19/105; H04N 19/11; H04N 19/136; H04N 19/147; H04N 19/159; H04N 19/176; H04N 19/182; H04N 19/593
See application file for complete search history.

(56) References Cited

U.S. PATENT DOCUMENTS

2006/0215763 A1*  9/2006  Morimoto ............ H04N 19/159
                                                     375/240.18
2007/0121731 A1   5/2007  Tanizawa et al.
(Continued)

FOREIGN PATENT DOCUMENTS

EP    2 136 564 A1    12/2009
JP    2009-284275 A   12/2009
(Continued)

OTHER PUBLICATIONS

Notice of Reasons for Rejection, Japanese Patent Application No. 2014-538589, dated Aug. 11, 2015.
(Continued)

*Primary Examiner* — Md Haque
(74) *Attorney, Agent, or Firm* — Harness, Dickey & Pierce, P.L.C.

(57) ABSTRACT

Setting a reference pixel signal from a decoded pixel signal in intra-prediction in which a prediction signal is generated in the same frame, acquiring prediction mode identification information that identifies an intra-prediction mode, gener-
(Continued)

ating a prediction signal based on the reference pixel signal and the prediction mode identification information, making a determination regarding correction of the prediction signal using a reference pixel having a shorter distance from a pixel that is a prediction target in the intra-prediction mode identified by the prediction mode identification information, and correcting the generated prediction signal according to a result of the determination are included in order to provide an image encoding method and an image decoding method capable of improving subjective image quality and coding efficiency using a closer decoded pixel in an intra-prediction process.

8 Claims, 28 Drawing Sheets

(51) Int. Cl.
*H04N 19/136* (2014.01)
*H04N 19/176* (2014.01)
*H04N 19/147* (2014.01)
*H04N 19/593* (2014.01)
*H04N 19/182* (2014.01)
*H04N 19/159* (2014.01)

(52) U.S. Cl.
CPC ......... *H04N 19/147* (2014.11); *H04N 19/159* (2014.11); *H04N 19/176* (2014.11); *H04N 19/182* (2014.11); *H04N 19/593* (2014.11)

(56) References Cited

U.S. PATENT DOCUMENTS

| | | | |
|---|---|---|---|
| 2010/0027655 A1 | 2/2010 | Matsuo et al. | |
| 2010/0135389 A1* | 6/2010 | Tanizawa | H04N 19/159 375/240.12 |
| 2011/0103485 A1* | 5/2011 | Sato | H04N 19/105 375/240.16 |
| 2012/0140821 A1* | 6/2012 | Drugeon | H04N 19/105 375/240.12 |
| 2012/0195378 A1* | 8/2012 | Zheng | H04N 19/105 375/240.12 |

FOREIGN PATENT DOCUMENTS

| | | |
|---|---|---|
| JP | 2010-171729 A | 8/2010 |
| JP | 2012-134869 A | 7/2012 |
| WO | WO-2007/063808 A1 | 6/2007 |
| WO | WO-2008-016605 A2 | 2/2008 |
| WO | WO-2008/102805 A1 | 8/2008 |
| WO | WO-2012/090286 A1 | 7/2012 |

OTHER PUBLICATIONS

Extended Search Report, European Patent Application No. 13842796.8, dated Mar. 23, 2016.
JCTVC-L-0128, AHG7: "Modification of intra angular prediction blending", Joint Collaborative Team on Video Coding (JCT-VC) of ITU-T SG 16 WP 3 and ISO/IEC JTC 1/SC 29/WG 11, Geneva, Jan. 2013, pp. 1-6.
Japanese Patent Office Notice of Allowance (Divisional) for JP 2015-202386, dated Nov. 22, 2016, with English translation.
EPO Office Action for parallel application EP 13 842 796.8, EP Rijswijk, NL, dated Dec. 16, 2016.
Sakae Okubo (au.), Shinya Kadono, Yoshihiro Kikuchi, Teruhiko Suzuki (ed.), "Third revision H.264/AVC textbook", Impress R&D Co. Ltd., pp. 110-116, 2009, with translation thereof.
ITU-T Study Group 16-Questions Jun. 2016: "Draft new Corrigendum 1 to H.264 Advanced video coding for generic audiovisual services", pp. 116-135, 2005.
Benjamin Bross, Woo-Jin Han, Jens-Rainer Ohm, Gary J. Sullivan, Thomas Wiegand, "High efficiency video coding (HEVC) text specification draft 8", JCTVC-J1003_d7.doc, Joint Collaborative Team on Video Coding (JCT-VC) of ITU-T SG16 WP3 and ISO/IEC JTC1/SC29/WG11, pp. 149-162, Jul. 2012.
Shohei Matsuo, Seishi Takamura, Hiroshi Fujii, Atsushi Shimizu, Intra angular prediction blending, Joint Collaborative Team on Video Coding (JCT-VC) of ITU-T SG16 WP3 and ISO/IEC JTC1/SC29/WG11 11th Meeting: Shanghai, CN, [JCTVC-K0155], Oct. 1, 2012, pp. 1-5.
International Search Report for PCT/JP2013/076073, ISA/JP, dated Nov. 12, 2013, with translation thereof.
Shiodera, Taichiro, et al., "Bidirectional Intra Prediction," ITU—Telecommunications Standardization Sector, Study Group 16, Question 6, Video Coding Experts Group (VCEG), Doc. VCEG-AE14, 31st Meeting: Marrakech, Morocco, Jan. 15-16, 2007.
Notice of Non-Final Rejection, Korean Patent Application No. 10-2015-7006343, dated Nov. 20, 2015.

* cited by examiner

| 0 | 0 | 0 | 0 | 0 | 0 | 0 | 0 |
|---|---|---|---|---|---|---|---|
| 1 | 0 | 0 | 0 | 0 | 0 | 0 | 0 |
| 1 | 0 | 0 | 0 | 0 | 0 | 0 | 0 |
| 1 | 1 | 0 | 0 | 0 | 0 | 0 | 0 |
| 1 | 1 | 0 | 0 | 0 | 0 | 0 | 0 |
| 1 | 1 | 1 | 0 | 0 | 0 | 0 | 0 |
| 1 | 1 | 1 | 1 | 0 | 0 | 0 | 0 |
| 1 | 1 | 1 | 1 | 1 | 0 | 0 | 0 |

CORRECTION DETERMINATION
RESULT INFORMATION

FIG. 10

| 984 | 948 | 934 | 926 | 914 | 922 | 930 | 920 |
|---|---|---|---|---|---|---|---|
| 1002 | 983 | 976 | 969 | 962 | 969 | 966 | 949 |
| 1013 | 1002 | 997 | 994 | 990 | 990 | 983 | 969 |
| 1017 | 1008 | 1007 | 1006 | 1002 | 998 | 991 | 980 |
| 1019 | 1014 | 1013 | 1011 | 1005 | 1000 | 996 | 986 |
| 1020 | 1017 | 1014 | 1012 | 1005 | 1002 | 996 | 987 |
| 1022 | 1018 | 1014 | 1010 | 1005 | 1002 | 995 | 987 |
| 1024 | 1017 | 1010 | 1007 | 1002 | 999 | 993 | 987 |

MODE 2 FOR 8×8 BLOCK

| 986 | 967 | 953 | 924 |
|---|---|---|---|
| 1010 | 1001 | 1000 | 984 |
| 1017 | 1013 | 1010 | 996 |
| 1013 | 1010 | 1003 | 992 |

MODE 2 FOR 4×4 BLOCK

| 768 | 910 | 968 | 991 | 1002 | 1004 | 1003 | 1000 |
|---|---|---|---|---|---|---|---|
| 661 | 840 | 922 | 954 | 970 | 982 | 983 | 990 |
| 601 | 799 | 896 | 933 | 961 | 981 | 991 | 991 |
| 584 | 780 | 883 | 929 | 957 | 982 | 990 | 992 |
| 566 | 768 | 879 | 928 | 965 | 984 | 993 | 990 |
| 562 | 763 | 881 | 939 | 967 | 981 | 986 | 983 |
| 554 | 762 | 884 | 939 | 968 | 978 | 981 | 966 |
| 558 | 772 | 879 | 931 | 948 | 959 | 956 | 940 |

MODE 34 FOR 8×8 BLOCK

| 823 | 948 | 990 | 990 |
|---|---|---|---|
| 803 | 882 | 988 | 929 |
| 801 | 833 | 957 | 918 |
| 759 | 809 | 940 | 879 |

MODE 34 FOR 4×4 BLOCK

FIG. 22

Table 8-2 – Specification of Intra4x4PredMode[luma4x4BlkIdx] and associated names

| Intra4x4PredMode[luma4x4BlkIdx] | Name of Intra4x4PredMode[luma4x4BlkIdx] |
|---|---|
| 0 | Intra_4x4_Vertical (prediction mode) |
| 1 | Intra_4x4_Horizontal (prediction mode) |
| 2 | Intra_4x4_DC (prediction mode) |
| 3 | Intra_4x4_Diagonal_Down_Left (prediction mode) |
| 4 | Intra_4x4_Diagonal_Down_Right (prediction mode) |
| 5 | Intra_4x4_Vertical_Right (prediction mode) |
| 6 | Intra_4x4_Horizontal_Down (prediction mode) |
| 7 | Intra_4x4_Vertical_Left (prediction mode) |
| 8 | Intra_4x4_Horizontal_Up (prediction mode) |

FIG. 23

Table 8-3 – Specification of Intra8x8PredMode[luma8x8BlkIdx] and associated names

| Intra8x8PredMode[luma8x8BlkIdx] | Name of Intra8x8PredMode[luma8x8BlkIdx] |
|---|---|
| 0 | Intra_8x8_Vertical (prediction mode) |
| 1 | Intra_8x8_Horizontal (prediction mode) |
| 2 | Intra_8x8_DC (prediction mode) |
| 3 | Intra_8x8_Diagonal_Down_Left (prediction mode) |
| 4 | Intra_8x8_Diagonal_Down_Right (prediction mode) |
| 5 | Intra_8x8_Vertical_Right (prediction mode) |
| 6 | Intra_8x8_Horizontal_Down (prediction mode) |
| 7 | Intra_8x8_Vertical_Left (prediction mode) |
| 8 | Intra_8x8_Horizontal_Up (prediction mode) |

FIG. 24

Table 8-4 – Specification of Intra16x16PredMode and associated names

| Intra16x16PredMode | Name of Intra16x16PredMode |
|---|---|
| 0 | Intra_16x16_Vertical (prediction mode) |
| 1 | Intra_16x16_Horizontal (prediction mode) |
| 2 | Intra_16x16_DC (prediction mode) |
| 3 | Intra_16x16_Plane (prediction mode) |

| Intra prediction mode | Associated names |
|---|---|
| 0 | Intra_Planar |
| 1 | Intra_DC |
| Otherwise(2..34) | Intra_Angular |

FIG. 29

| intraPredMode | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | - | 32 | 26 | 21 | 17 | 13 | 9 | 5 | 2 | 0 | -2 | -5 | -9 | -13 | -17 | -21 | -26 |
| intraPredMode | 18 | 19 | 20 | 21 | 22 | 23 | 24 | 25 | 26 | 27 | 28 | 29 | 30 | 31 | 32 | 33 | 34 |
| intraPredAngle | -32 | -26 | -21 | -17 | -13 | -9 | -5 | -2 | 0 | 2 | 5 | 9 | 13 | 17 | 21 | 26 | 32 |

FIG. 30

| intraPredMode | 11 | 12 | 13 | 14 | 15 | 16 | 17 | 18 |
|---|---|---|---|---|---|---|---|---|
| invAngle | -4096 | -1638 | -910 | -630 | -482 | -390 | -315 | -256 |
| intraPredMode | 19 | 20 | 21 | 22 | 23 | 24 | 25 | 26 |
| invAngle | -315 | -390 | -482 | -630 | -910 | -1638 | -4096 | - |

INTRA-PREDICTION ENCODING METHOD, INTRA-PREDICTION DECODING METHOD, INTRA-PREDICTION ENCODING APPARATUS, INTRA-PREDICTION DECODING APPARATUS, PROGRAM THEREFOR AND RECORDING MEDIUM HAVING PROGRAM RECORDED THEREON

CROSS-REFERENCE TO RELATED APPLICATIONS

This application is a 371 U.S. National Stage of International Application No. PCT/JP2013/076073, filed on Sep. 26, 2013, which claims priority to Japanese Patent Application No. 2012-217888, filed on Sep. 28, 2012. The entire disclosures of the above applications are incorporated herein by reference.

TECHNICAL FIELD

The present invention relates to encoding and decoding of an image signal, and more particularly, to a technology for encoding or decoding an image signal using in-screen prediction (intra-prediction).

BACKGROUND ART

In an international standard video compression scheme H.264/AVC and a next-generation high efficiency video coding HEVC currently under development, two types of processes such as prediction and transformation are performed so as to efficiently compress information of enormous videos. The prediction is classified into two types such as inter-prediction encoding (referred to also as inter-frame prediction encoding or inter-screen encoding) and intra-prediction encoding (in-frame prediction encoding or in-screen encoding). The inter-frame prediction encoding is a scheme of achieving information compression using correlation in a time domain within a video. Inter-frame prediction using motion compensation is a representative example thereof.

On the other hand, the intra-frame prediction encoding is a scheme of generating a prediction signal using a decoded pixel around an encoding target block as adopted in, for example, H.264/AVC, that is, a scheme of achieving information compression using correlation in a frame. For the transform, a scheme known as a discrete cosine transform (DCT) is adopted in an international standard compression scheme JPEG for a still image and an international standard compression scheme MPEG-2 for a video. In JPEG2000 that is a standard subsequent to JPEG, a scheme known as a discrete wavelet transform (DWT) is adopted. After the prediction is performed between frames and in the frame, a prediction residual signal (referred to as a prediction error signal) is subjected to a transform and quantization and finally converted to a binary signal (bit stream) through entropy encoding.

In H.264/AVC, a macroblock (hereinafter referred to as an MB) is set as a unit of an encoding process, and a size thereof is 16×16. FIG. 20 is a diagram showing a prediction mode of a 4×4 block. In an example of prediction mode 0, a pixel value of M is used for prediction of pixels N0, N1, N2, and N3. Similarly, in the other modes, a prediction signal is generated along a prediction direction from a decoded pixel. FIG. 21 is a diagram showing a prediction mode of a 16×16 block. There are two types of prediction sizes in the intra-prediction encoding of H.264/AVC, as shown in FIGS. 20 and 21. Nine types of prediction modes (prediction modes 0 to 8) are prepared in the 4×4 block, and four types of prediction modes (prediction modes 0 to 3) are prepared in the 16×16 block. In FREXT that is an extended standard of H.264/AVC, an 8×8 prediction size is added in addition thereto, and there are nine types of prediction modes thereof having the same definition as 4×4.

FIGS. 22, 23 and 24 are diagrams showing a relationship between a prediction mode and a prediction number. According to the prediction mode defined in FIGS. 22, 23 and 24, a prediction image is generated, and a residual signal thereof is encoded through a transform and quantization. In the case of decoding, similarly, the prediction signal is generated from the decoded pixel using a decoded prediction mode number, and added to the decoded prediction residual signal to obtain the decoded signal.

On the other hand, in HEVC, a unit of an encoding process is not an MB unit, but the encoding is performed in units of blocks called coding units (CU). A largest unit is called a largest coding unit (LCU), and a 64×64 size is usually set in reference software (HEVC test Model: HM) of HEVC. A 64×64 LCU is partitioned into 8×8 CUs as smallest units on the quadtree basis. Each CU is partitioned into a block in which the prediction is performed, called a prediction unit (PU), and a block in which the transform is performed, called a transform unit (TU). The PU and the TU are independently defined in the CU. The PU and the TU are basically partitioned on the quadtree basis, similar to the CU, but there is a tool that applies partition other than a square. A tool that permits non-square partition of the PU is referred to as asymmetric motion partition (AMP), and a tool that permits non-square partition of the TU is referred to as a non-square quadtree transform (NSQT).

FIG. 25 is a diagram showing a definition of each processing unit in the HEVC. In H.264/AVC, encoding is performed in a 16×16 block, but in HEVC, there is a characteristic in that the encoding is performed in units of blocks having a greater size such as a 64×64 block. Encoding, prediction, and transform processes for a greater size as described above greatly contribute to improvement of coding efficiency, particularly at a high resolution.

In the intra-prediction encoding of HEVC, a new prediction mode or the like is added so as to improve performance of intra-prediction encoding in H.264/AVC. One mode is a prediction mode called planar prediction, and the other mode is a prediction mode realizing a finer prediction direction (angular prediction). FIG. 26 is a diagram showing a corresponding relationship between an intra-prediction mode number and an intra-prediction mode in a prediction unit (common in all block sizes) of HEVC. The corresponding relationship between the prediction mode number and the prediction mode is as shown in FIG. 26. FIGS. 27 and 28 are diagrams showing a correspondence relationship between an angular prediction mode and an angle. A difference in a prediction direction is as shown in FIGS. 27 and 28. Eight directions are prepared in H.264/AVC (FIG. 27), whereas 33 directions (FIG. 28) are prepared for HEVC.

In the planar prediction, when a block size is nT, and a reference signal is p[x][y] (x and y indicate a position of a reference pixel, and an upper left pixel position of the prediction target block corresponds to x=0 and y=0), the prediction signal predSamples[x][y] (x and y are coordinates of a prediction target block, and a top left pixel position corresponds to x=0 and y=0) is defined as in Equation (1).

$$\text{predSamples}[x][y] = ((nT-1-x) \times p[-1][y] + (x+1) \times p[nT][-1] + (nT-1-y) \times p[x][-1] + (y+1) \times p[-1]) \\ [nT]+nT) >> (\text{Log}_2(nT)+1) \quad (1)$$

The prediction signal can be flexibly generated, particularly, using pixels located at an upper right (p[nT][−1]) and a lower left (p[−1][nT]), and there is a characteristic in that a selected ratio is high in intra-prediction encoding of HEVC.

In the angular prediction, a prediction signal predSamples[x][y] (x and y are coordinates of the prediction target block, and a top upper left pixel position is x=0 and y=0) is generated as follows.

(A) A prediction mode number is equal to or more than 18

1. Arrangement of reference pixels ref[x] (x=−nT, . . . , 2×nT; nT is a block size)

$$\text{ref}[x]=p[-1+x][-1](x=0, \ldots, nT)$$

When an angle (intraPredAngle) corresponding to the prediction mode number defined in FIG. 29 is smaller than 0 and (nT×intraPredAngle)>>5 is smaller than −1:

$$\text{ref}[x]=p[-1][-1+((x \times \text{invAngle}+128)>>8)](x=(nT \times \text{intraPredAngle})>>5, \ldots, -1)$$

Here, a definition of invAngle is as shown in FIG. 30.

FIG. 29 is a diagram showing a correspondence relationship between a prediction mode and an angle. Further, FIG. 30 is a diagram showing a correspondence relationship between the prediction mode and a parameter.

In the other cases:

$$\text{ref}[x]=p[1+x][-1](x=nT+1, \ldots, 2 \times nT)$$

2. Arrangement of reference pixels ref[x] (x=0, . . . , nT−1)

(a) An index (iIdx) and a multiplier parameter (iFact) are defined as follows.

$$i\text{Idx}=((y+1) \times \text{intraPredAngle})>>5$$

$$i\text{Fact}=((y+1) \times \text{intraPredAngle})\&31$$

(b) The following process is performed according to a value of iFact.

When iFact is not 0:

$$\text{predSamples}[x][y]=((32-i\text{Fact}) \times \text{ref}[x+i\text{Idx}+1]+i\text{Fact} \times \text{ref}[x+i\text{Idx}+2]+16)>>5$$

When iFact is 0:

$$\text{predSamples}[x][y]=\text{ref}[x+i\text{Idx}+1]$$

(c) The prediction mode number is 26 (vertical prediction): (x=0, y=0, . . . , nT−1)

$$\text{predSamples}[x][y]=\text{Clip1}Y(p[x][-1]+(p[-1][y]-p[-1][-1])>>1))$$

(B) The prediction mode number is less than 18

1. Arrangement of reference pixels ref[x] (x=−nT, . . . , 2×nT)

$$\text{ref}[x]=p[-1][-1+x](x=0, \ldots, nT)$$

When intraPredAngle defined in FIG. 29 is smaller than 0 and (nT×intraPredAngle)>>5 is smaller than −1:

$$\text{ref}[x]=p[-1+((x \times \text{invAngle}+128)>>8)][-1](x=(nT \times \text{intraPredAngle})>>5, \ldots, -1)$$

In the other cases:

$$\text{ref}[x]=p[-1][-1+x](x=nT+1, \ldots, 2 \times nT)$$

2. Arrangement of reference pixels ref[x] (x=0, . . . , nT−1)

(a) An index (iIdx) and a multiplier parameter (iFact) are defined as follows.

$$i\text{Idx}=((x+1) \times \text{intraPredAngle})>>5$$

$$i\text{Fact}=((x+1) \times \text{intraPredAngle})\&31$$

(b) The following process is performed according to a value of iFact

When iFact is not 0:

$$\text{predSamples}[x][y]=((32-i\text{Fact}) \times \text{ref}[y+i\text{Idx}+1]+i\text{Fact} \times \text{ref}[y+i\text{Idx}+2]+16)>>5$$

When iFact is 0:

$$\text{predSamples}[x][y]=\text{ref}[y+i\text{Idx}+1]]$$

(c) The prediction mode number is 10 (horizontal prediction): (x=0, . . . , nT−1 and y=0)

$$\text{predSamples}[x][y]=\text{Clip1}Y(p[-1][y]+(p[x][-1]-p[-1][-1])>>1)$$

Since such a process enables generation of a fine prediction signal in 33 directions and generation of a flexible prediction signal, performance of the intra-prediction encoding is improved relative to H.264/AVC. The matters described above have been described in detail in Non-Patent Literatures 1, 2 and 3.

PRIOR ART DOCUMENTS

Non-Patent Documents

Non-Patent Document 1
Sakae Okubo (au.), Shinya Kadono, Yoshihiro Kikuchi, Teruhiko Suzuki (ed.), "Third revision H.264/AVC textbook," Impress R&D Co. Ltd., pp. 110-116, 2009
Non-Patent Document 2
ITU-T Study Group 16-Questions 6/16: "Draft new Corrigendum 1 to H.264 Advanced video coding for generic audiovisual services," pp. 116-135, 2005
Non-Patent Document 3
Benjamin Bross, Woo-Jin Han, Jens-Rainer Ohm, Gary J. Sullivan, Thomas Wiegand, "High efficiency video coding (HEVC) text specification draft 8," JCTVC-J1003_d7.doc, Joint Collaborative Team on Video Coding (JCT-VC) of ITU-T SG16 WP3 and ISO/IEC JTC1/SC29/WG11, pp. 149-162, July 2012

SUMMARY OF INVENTION

Problem to be Solved by the Invention

In intra-prediction of HEVC described in Non-Patent Literature 3, since the number of prediction directions increases for H.264/AVC, coding efficiency is improved. However, in HEVC, since a prediction block size is expanded, the method shown in Non-Patent Literature 3 cannot be said to be optimal for generation of the prediction signal in a position far from the decoded reference pixel, particularly, in a large block size. Generally, in the case of the intra-prediction, since there is a large number of available pixels having a short distance from the reference pixel with respect to the upper left side of the block, prediction residual energy tends to decrease, whereas the prediction residual energy tends to increase since the distance from the reference pixel increases with respect to the lower right side of the block.

The present invention has been made in view of the above-described circumstances, and an object of the present invention is to provide an intra-prediction encoding method, an intra-prediction decoding method, an intra-prediction encoding apparatus, an intra-prediction decoding apparatus, a program therefor and a recording medium having the program recorded thereon capable of improving subjective image quality and coding efficiency using a closer decoded pixel in an intra-prediction process.

Means for Solving the Problems

An intra-prediction encoding method according to the present invention includes setting a reference pixel signal from a decoded pixel signal in intra-prediction in which a prediction signal is generated in the same frame; acquiring prediction mode identification information that identifies an intra-prediction mode; generating a prediction signal based on the reference pixel signal and the prediction mode identification information; making a determination regarding correction of the prediction signal using a reference pixel having a shorter distance from a pixel that is a prediction target in the intra-prediction mode identified by the prediction mode identification information; and correcting the generated prediction signal according to the result of the determination.

In the intra-prediction encoding method according to one aspect of the present invention, the determination includes reading predetermined correction information and determining the correction range of the prediction target pixel based on the intra-prediction mode.

In the intra-prediction encoding method according to one aspect of the present invention, the determination includes reading predetermined correction information and determining a weight coefficient indicating a ratio at which the prediction target pixel is corrected based on the intra-prediction mode.

In the intra-prediction encoding method according to one aspect of the present invention, the determination includes encoding a number for identifying the correction information and transmitting the number to a decoding side.

In the intra-prediction encoding method according to one aspect of the present invention, the determination includes determining a correction range of the prediction target pixel from a parameter indicating a shape of a function, the function being defined using a decoded pixel adjacent to the upper left side of a prediction target block as an origin.

In the intra-prediction encoding method according to one aspect of the present invention, the determination includes encoding the parameter indicating the shape of the function and transmitting the parameter to a decoding side.

An intra-prediction decoding method according to the present invention includes setting a reference pixel signal from a decoded pixel signal in intra-prediction in which a prediction signal is generated in the same frame; acquiring prediction mode identification information that identifies an intra-prediction mode; generating a prediction signal based on the reference pixel signal and the prediction mode identification information; making a determination regarding correction of the prediction signal using a reference pixel having a shorter distance from a pixel that is a prediction target in the intra-prediction mode identified by the prediction mode identification information; and correcting the generated prediction signal according to the result of the determination.

In the intra-prediction decoding method according to one aspect of the present invention, the determination includes reading predetermined correction information and determining a correction range of the prediction target pixel based on the intra-prediction mode.

In the intra-prediction decoding method according to one aspect of the present invention, the determination includes reading predetermined correction information and determining a weight coefficient indicating a ratio at which the prediction target pixel is corrected based on the intra-prediction mode.

In the intra-prediction decoding method according to one aspect of the present invention, the determination includes decoding a number for identifying the correction information and restoring the correction information.

In the intra-prediction decoding method according to one aspect of the present invention, the determination includes determining a correction range of the prediction target pixel from a parameter indicating a shape of a function, the function being defined using a decoded pixel adjacent to the upper left side of a prediction target block as an origin.

In the intra-prediction decoding method according to one aspect of the present invention, the determination includes restoring the shape of the function on the decoding side by decoding the encoded parameter indicating the shape of the function.

An intra-prediction encoding apparatus according to the present invention includes a setting means for setting a reference pixel signal from a decoded pixel signal in intra-prediction in which a prediction signal is generated in the same frame; an acquiring means for acquiring prediction mode identification information that identifies an intra-prediction mode; a generating means for generating a prediction signal based on the reference pixel signal and the prediction mode identification information; a determination means for making a determination regarding correction of the prediction signal using a reference pixel having a shorter distance from a pixel that is a prediction target in the intra-prediction mode identified by the prediction mode identification information; and a correcting means for correcting the generated prediction signal according to the result of the determination.

In the intra-prediction encoding apparatus according to one aspect of the present invention, the determination means reads predetermined correction information and determines a correction range of the prediction target pixel based on the intra-prediction mode.

In the intra-prediction encoding apparatus according to one aspect of the present invention, the determination means reads predetermined correction information, and determines a weight coefficient indicating a ratio at which the prediction target pixel is corrected based on the intra-prediction mode.

In the intra-prediction encoding apparatus according to one aspect of the present invention, the determination means encodes a number for identifying the correction information and transmits the number to a decoding side.

In the intra-prediction encoding apparatus according to one aspect of the present invention, the determination means determines a correction range of the prediction target pixel from a parameter indicating a shape of a function, the function being defined using a decoded pixel adjacent to the upper left side of a prediction target block as an origin.

In the intra-prediction encoding apparatus according to one aspect of the present invention, the determination means encodes the parameter indicating the shape of the function and transmits the parameter to a decoding side.

An intra-prediction decoding apparatus according to the present invention includes a setting means for setting a reference pixel signal from a decoded pixel signal in intra-prediction in which a prediction signal is generated in the same frame; an acquiring means for acquiring prediction mode identification information that identifies an intra-prediction mode; a generating means for generating a prediction signal based on the reference pixel signal and the prediction mode identification information; a determination means for making a determination regarding correction of the prediction signal using a reference pixel having a shorter distance from a pixel that is a prediction target in the intra-prediction mode identified by the prediction mode identification information; and a correcting means for correcting the generated prediction signal according to the result of the determination.

In the intra-prediction decoding apparatus according to one aspect of the present invention, the determination means reads predetermined correction information and determines a correction range of the prediction target pixel based on the intra-prediction mode.

In the intra-prediction decoding apparatus according to one aspect of the present invention, the determination means reads predetermined correction information, and determines a weight coefficient indicating a ratio at which the prediction target pixel is corrected based on the intra-prediction mode.

In the intra-prediction decoding apparatus according to one aspect of the present invention, the determination means decodes a number for identifying the correction information and restores the correction information.

In the intra-prediction decoding apparatus according to one aspect of the present invention, the determination means determines a correction range of the prediction target pixel from a parameter indicating a shape of a function, the function being defined using a decoded pixel adjacent to the upper left side of a prediction target block as an origin.

In the intra-prediction decoding apparatus according to one aspect of the present invention, the determination means restores the shape of the function on the decoding side by decoding the encoded parameter indicating the shape of the function.

The present invention is an intra-prediction encoding program for causing a computer to execute the intra-prediction encoding method.

The present invention is an intra-prediction decoding program for causing a computer to execute the intra-prediction decoding method.

The present invention is a computer-readable recording medium having the intra-prediction encoding program recorded thereon.

The present invention is a computer-readable recording medium having the intra-prediction decoding program recorded thereon.

Advantageous Effects of the Invention

According to the present invention, it is possible to reduce prediction residual energy and realize improvement of subjective image quality and coding efficiency by using a closer decoded reference pixel to generate the prediction signal in the intra-prediction.

BRIEF DESCRIPTION OF DRAWINGS

FIG. 6 is an illustrative diagram showing an example of correction matrix information.

FIG. 9 is a diagram showing an example in which a block size is 8×8, and mode 34 (a mode in which prediction is performed at 45° from an upper right to a lower left) is selected.

FIG. 10 is an illustrative diagram showing an example of the correction matrix information.

FIG. 22 is an illustrative diagram showing a relationship between a prediction mode and a prediction number in H.264/AVC.

FIG. 23 is an illustrative diagram showing a relationship between a prediction mode and a prediction number in H.264/AVC.

FIG. 24 is an illustrative diagram showing a relationship between a prediction mode and a prediction number in H.264/AVC.

FIG. 29 is a diagram showing a correspondence relationship between an intra angular prediction mode and an angle.

FIG. 30 is a diagram showing a correspondence relationship between an intra angular prediction mode and a parameter invAngle.

EMBODIMENTS FOR CARRYING OUT THE INVENTION

First Embodiment

Figure 1:
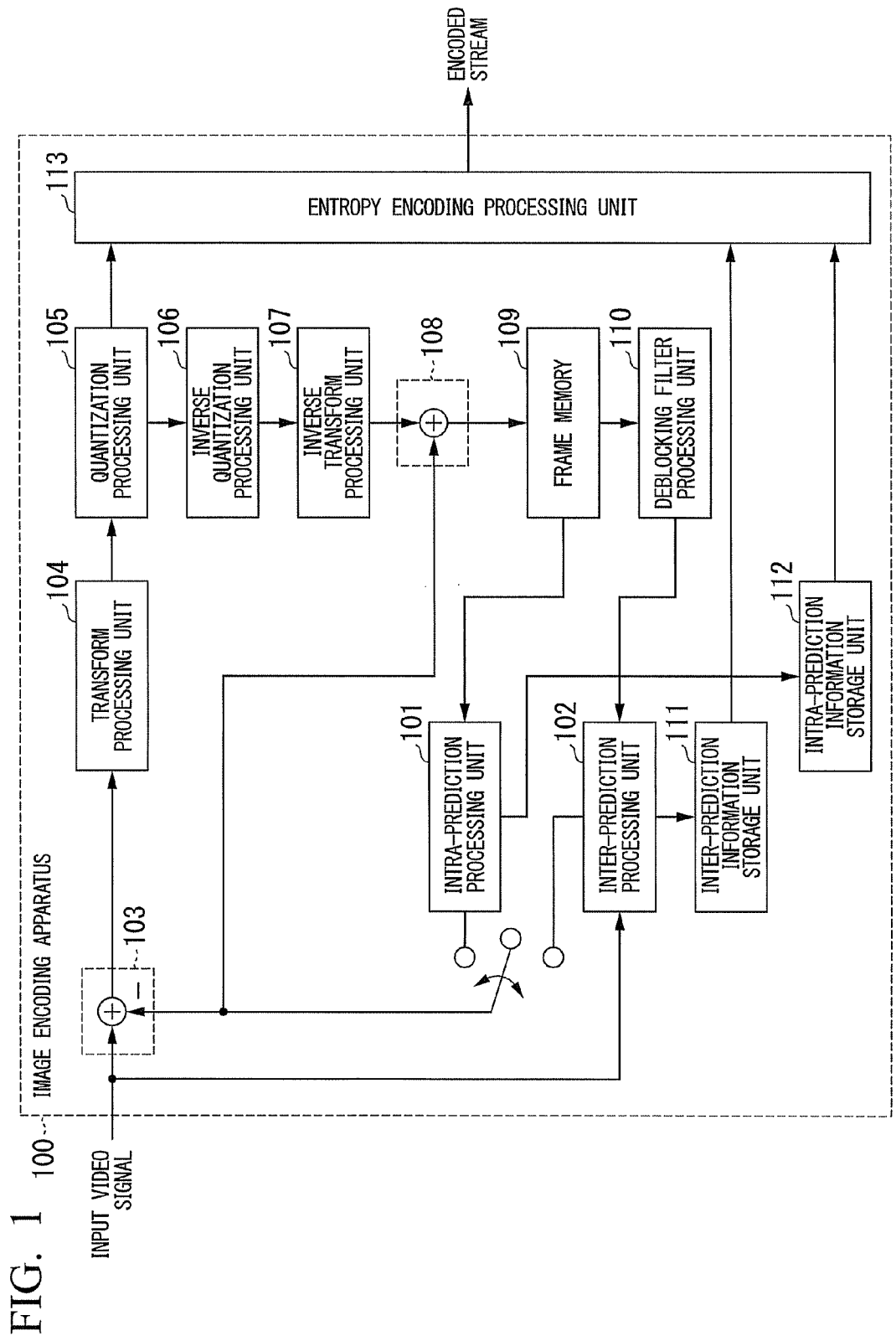
FIG. 1 is a block diagram showing a configuration of an image encoding apparatus in a first embodiment of the present invention.

Hereinafter, an image encoding apparatus and an image decoding apparatus according to a first embodiment of the present invention will be described with reference to the drawings. FIG. 1 is a block diagram showing a configuration of the image encoding apparatus in the embodiment. The image encoding apparatus 100 receives an input video signal that is an encoding target, partitions each frame of the input video signal into a plurality of blocks, encodes each block, and outputs a bit stream of an encoding result as an encoded stream. Further, the image includes a still image, a moving image, and a video.

The image encoding apparatus 100 includes an intra-prediction processing unit 101, an inter-prediction processing unit 102, a prediction residual signal generation unit 103, a transform processing unit 104, a quantization processing unit 105, an inverse quantization processing unit 106, an inverse transform processing unit 107, a decoded-signal generation unit 108, a frame memory 109, a deblocking filter processing unit 110, an inter-prediction information storage unit 111, an intra-prediction information storage unit 112, and an entropy encoding processing unit 113, as shown in FIG. 1.

The image encoding apparatus 100 shown in FIG. 1 has a configuration characterized by the intra-prediction processing unit 101. Each of the other functional units is the same as a functional unit included in a general image encoding apparatus used as an encoder for H.264/AVC or the like. Further, while a filter in a loop that removes encoding noise called a sample adaptive offset (SAO) or an adaptive loop filter (ALF) is applied in addition to the deblocking filter in HEVC that is currently under development, a filter processing unit in a loop other than the deblocking filter may be inserted before and after the deblocking filter processing unit 110.

The intra-prediction processing unit 101 receives an input video signal, and generates a prediction signal based on the input video signal. Further, the intra-prediction processing unit 101 generates intra-prediction information including a prediction mode or the like based on the input video signal, and stores the generated intra-prediction information in the intra-prediction information storage unit 112.

The inter-prediction processing unit 102 receives the input video signal, and a reference image output from the deblocking filter processing unit 110. The inter-prediction processing unit 102 generates a prediction signal based on the input video signal and the reference image. Further, the inter-prediction processing unit 102 generates inter-prediction information containing a motion vector based on the input video signal and the reference signal, and stores the generated inter-prediction information in the inter-prediction information storage unit 111.

The prediction residual signal generation unit 103 calculates a difference between the input video signal and the prediction signal output from the intra-prediction processing unit 101 or the inter-prediction processing unit 102. The prediction residual signal generation unit 103 outputs the calculated difference to the transform processing unit 104 as a prediction residual signal.

The transform processing unit 104 performs an orthogonal transform such as a discrete cosine transform (DCT) on the prediction residual signal input from the prediction residual signal generation unit 103. The transform processing unit 104 outputs a transform coefficient obtained through the orthogonal transform to the quantization processing unit 105.

The quantization processing unit 105 quantizes the transform coefficient input from the transform processing unit 104 and outputs the quantized transform coefficient to the inverse quantization processing unit 106 and the entropy encoding processing unit 113.

The inverse quantization processing unit 106 performs an inverse quantization on the transform coefficient input from the quantization processing unit 105 and outputs the resultant transform coefficient to the inverse transform processing unit 107. The inverse transform processing unit 107 performs an inverse orthogonal transform on the transform coefficient input from the inverse quantization processing unit 106. The inverse transform processing unit 107 outputs a prediction residual decoded signal obtained through the inverse orthogonal transform to the decoded-signal generation unit 108.

The decoded-signal generation unit 108 adds the prediction residual decoded signal input from the inverse transform processing unit 107 and the prediction signal output from the intra-prediction processing unit 101 or the inter-prediction processing unit 102. The decoded-signal generation unit 108 stores an addition result in the frame memory 109 as a decoded signal of an encoded encoding target block. This decoded signal is used as a reference image in the intra-prediction processing unit 101 or the inter-prediction processing unit 102.

The frame memory 109 stores the decoded signal generated and output by the decoded-signal generation unit 108. The deblocking filter processing unit 110 reads the decoded signal stored in the frame memory 109, and performs a deblocking filter processing on the read decoded signal. The deblocking filter processing unit 110 outputs an image after the deblocking filter processing to the inter-prediction processing unit 102 as a reference image.

The inter-prediction information storage unit 111 stores the inter-prediction information generated by the inter-prediction processing unit 102. The intra-prediction information storage unit 112 stores the intra-prediction information generated by the intra-prediction processing unit 101.

The entropy encoding processing unit 113 performs entropy encoding on the transform coefficient quantized in the quantization processing unit 105, the inter-prediction information stored in the inter-prediction information storage unit 111, and the intra-prediction information stored in the intra-prediction information storage unit 112, and outputs an encoded stream.

The image encoding apparatus 100 includes the respective functional units described above, and thus partitions each frame of the input video signal into a plurality of blocks, performs block-based prediction encoding to encode the input video signal, and outputs the obtained encoded stream.

Figure 2:
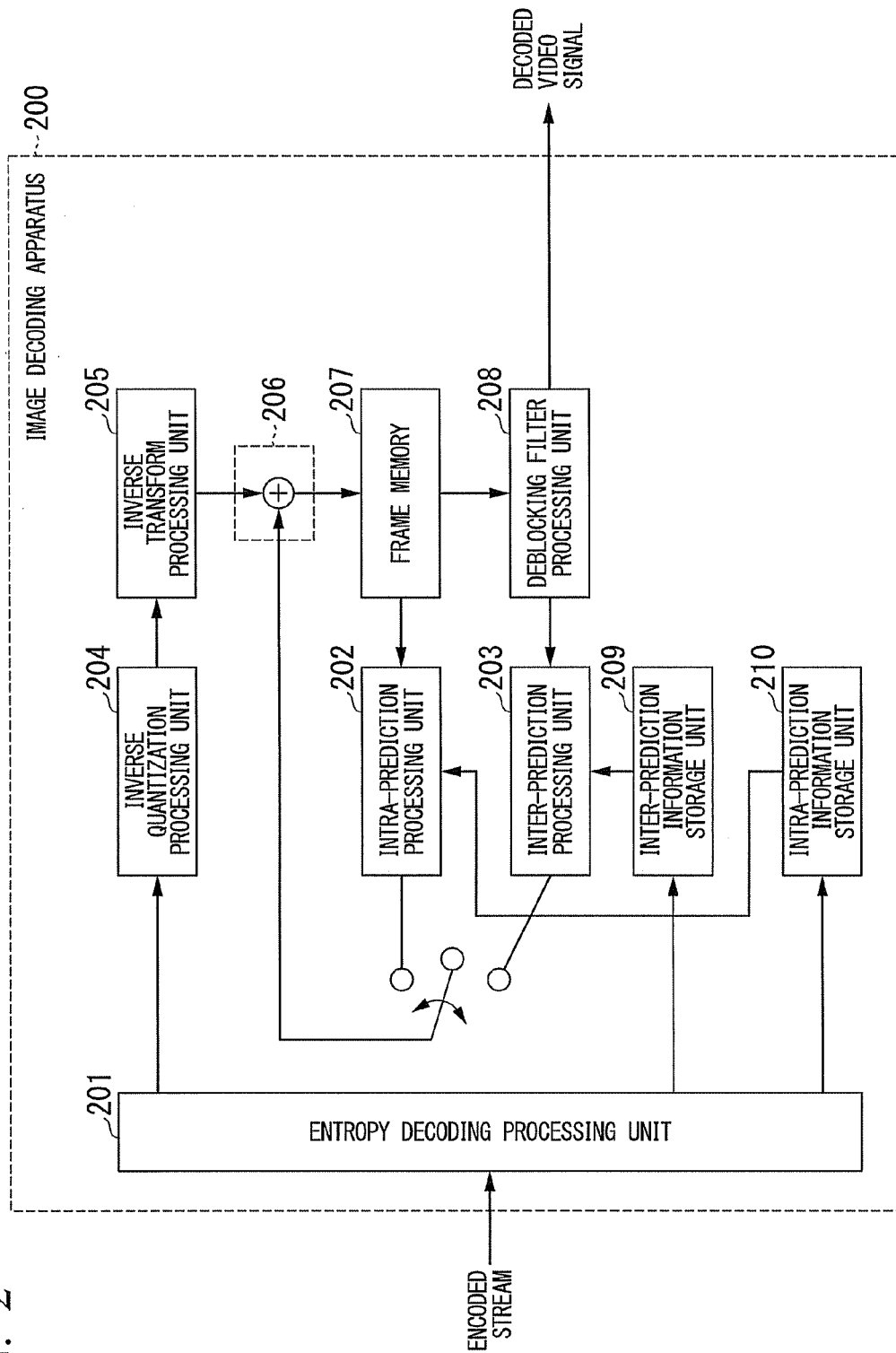
FIG. 2 is a block diagram showing a configuration of an image decoding apparatus in the first embodiment of the present invention.

FIG. 2 is a block diagram showing a configuration of an image decoding apparatus 200 in the first embodiment. The image decoding apparatus 200 receives the encoded stream encoded and output by the image encoding apparatus 100 shown in FIG. 1, decodes the encoded stream, and outputs a decoded video signal that is a decoded image.

The image decoding apparatus 200 includes an entropy decoding processing unit 201, an intra-prediction processing unit 202, an inter-prediction processing unit 203, an inverse quantization processing unit 204, an inverse transform processing unit 205, a decoded-signal generation unit 206, a frame memory 207, a deblocking filter processing unit 208, an inter-prediction information storage unit 209, and an intra-prediction information storage unit 210, as shown in FIG. 2.

The image decoding apparatus 200 shown in FIG. 2 has a configuration characterized by the intra-prediction processing unit 202. Other respective functional units are the same as functional units included in a general image decoding apparatus used as a decoder for H.264/AVC or the like.

The entropy decoding processing unit 201 receives an input encoded stream, performs entropy decoding on the quantization transform coefficient of a block decoding target from the input encoded stream, and performs entropy decoding on the intra-prediction information regarding the intra-prediction and the inter-prediction information regarding the inter-prediction. Further, the entropy decoding processing unit 201 outputs the quantization transform coefficient to the inverse quantization processing unit 204, stores the inter-prediction information in the inter-prediction information storage unit 209, and stores the intra-prediction information in the intra-prediction information storage unit 210.

The intra-prediction processing unit 202 reads the decoded signal stored in the frame memory 207 as the reference image. Further, the intra-prediction processing unit 202 reads the intra-prediction information from the intra-prediction information storage unit 210. Also, the intra-prediction processing unit 202 generates a prediction signal based on the read reference image and the read intra-prediction information.

The inter-prediction processing unit 203 reads the inter-prediction information from the inter-prediction information storage unit 209. Also, the inter-prediction processing unit 203 generates a prediction signal based on the inter-prediction information, and the reference image input from the deblocking filter processing unit 208.

The inverse quantization processing unit 204 performs an inverse quantization on the quantization transform coefficient input from the entropy decoding processing unit 201 to calculate a decoding transform coefficient, and outputs the calculated decoding transform coefficient to the inverse transform processing unit 205.

The inverse transform processing unit 205 performs an inverse orthogonal transform on the decoding transform coefficient input from the inverse quantization processing unit 204 to calculate a prediction residual decoded signal, and outputs the calculated prediction residual decoded signal to the decoded-signal generation unit 206.

The decoded-signal generation unit 206 adds the prediction residual decoded signal input from the inverse transform processing unit 205 and the prediction signal output from the intra-prediction processing unit 202 or the inter-prediction processing unit 203. Also, the decoded-signal generation unit 206 stores an addition result in the frame memory 207 as a decoded signal of a block decoding target.

The frame memory 207 stores the decoded signal calculated by the decoded-signal generation unit 206.

The deblocking filter processing unit 208 reads the decoded signal from the frame memory 207, and performs filter processing on the image indicated by the read decoded signal to reduce encoding distortion. The deblocking filter processing unit 208 outputs an image after the filter processing as a decoded video signal. Further, the deblocking filter processing unit 208 outputs the image after the filter processing to the inter-prediction processing unit 203 as the reference image. Further, a filter processing unit in a loop such as a sample adaptive offset or an adaptive loop filter may be inserted before and after the deblocking filter processing unit 208, similar to the image encoding apparatus 100.

The inter-prediction information storage unit 209 stores the inter-prediction information obtained through decoding in the entropy decoding processing unit 201. The intra-prediction information storage unit 210 stores the intra-prediction information obtained through decoding in the entropy decoding processing unit 201.

The image decoding apparatus 200 includes the respective functional units described above, and thus receives the encoded stream of the video encoded through block-based prediction encoding, decodes the video from the received encoded stream, and outputs a decoded video signal.

Figure 3:
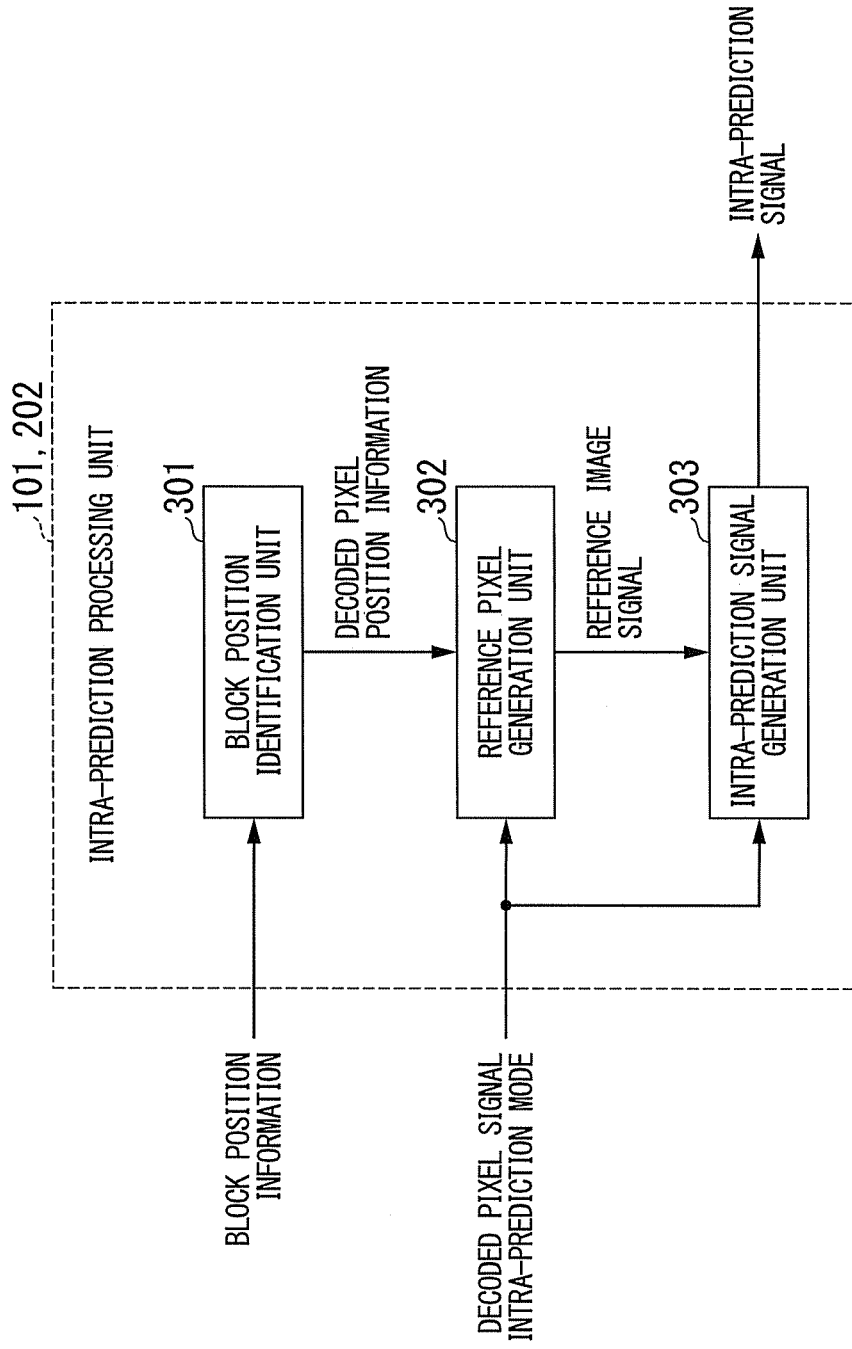
FIG. 3 is a block diagram showing a configuration example of an intra-prediction processing unit 101 and an intra-prediction processing unit 202 shown in FIGS. 1 and 2.

Next, a configuration of the intra-prediction processing unit 101 and the intra-prediction processing unit 202 shown in FIGS. 1 and 2 will be described with reference to FIG. 3. FIG. 3 is a block diagram showing a configuration example of the intra-prediction processing unit 101 and the intra-prediction processing unit 202 shown in FIGS. 1 and 2. Since the intra-prediction processing unit 101 and the intra-prediction processing unit 202 perform a common process and include the same configuration, the intra-prediction processing unit 101 will be hereinafter described and a description of the intra-prediction processing unit 202 will be omitted.

The intra-prediction processing unit 101 includes a block position identification unit 301, a reference pixel generation unit 302, and an intra-prediction signal generation unit 303, as shown in FIG. 3. The block position identification unit 301 identifies a position of a block to be subjected to intra-prediction, which is a processing target. Further, in order to identify the position of the block, the block position identification unit 301 receives block position information (space coordinates, or a position of an LCU/CU/PU/TU) that is a position in a frame or a slice, and outputs decoded pixel position information for acquiring the reference pixel.

The reference pixel generation unit 302 receives the decoded pixel position information output by the block position identification unit 301, the decoded pixel signal, and the intra-prediction mode. The reference pixel generation unit 302 performs, for example, storage of the reference pixel necessary for prediction signal generation, and necessary filter processing based on the decoded pixel position information. The storage of the reference pixel stated herein means, for example, preparation for the above-described p[x] [y] or generation of the reference pixel arrangement ref[x]. Further, the necessary filter processing refers to, for example, a process of applying a smoothing filter of [1, 2, 1]/4, called intra smoothing, to the reference pixel and applying a pixel value after the filtering to a prediction value, or filter processing for taking a ratio of positions on 32 partitions shown in 2. (b) of each of (A) and (B) described above. That is, the filter processing of the decoded pixel necessary for generation of the prediction signal is all performed by the reference pixel generation unit 302. The reference pixel generation unit 302 outputs the decoded pixel signal after various filter processing to the intra-prediction signal generation unit 303 as a reference pixel signal to be copied to the arrangement of the prediction signals.

The intra-prediction signal generation unit 303 generates an intra-prediction signal based on the reference pixel signal input from the reference pixel generation unit 302, the decoded pixel signal and the intra-prediction mode, and outputs the intra-prediction signal.

As described above, the intra-prediction processing unit 101 outputs the intra-prediction signal based on the block position information, the decoded pixel signal, and the intra-prediction mode that are input, using the block position identification unit 301, the reference pixel generation unit 302, and the intra-prediction signal generation unit 303.

Figure 4:
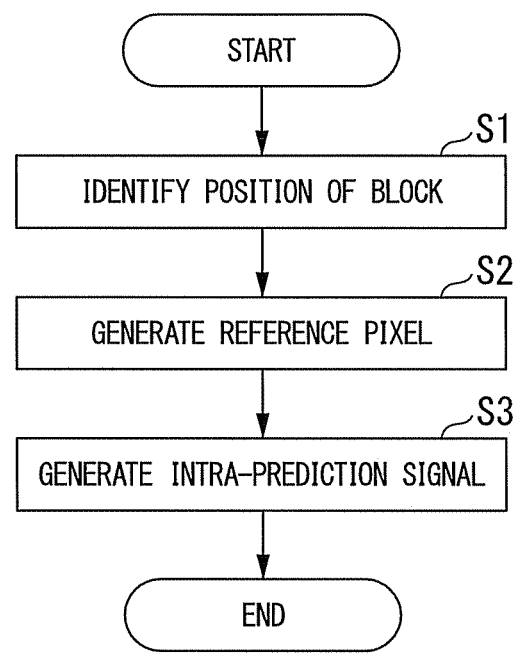
FIG. 4 is a flowchart showing an operation of an intra-prediction process performed by the intra-prediction processing unit 101 shown in FIG. 3.

Next, a processing operation of the intra-prediction processing unit 101 shown in FIG. 3 will be described with reference to FIG. 4. FIG. 4 is a flowchart showing an operation of the intra-prediction process performed by the intra-prediction processing unit 101 shown in FIG. 3. The block position identification unit 301 identifies a position of a block to be subjected to intra-prediction, which is a processing target, based on the input block position information according to the procedure described in, for example, Non-Patent Literature 3, and outputs information indicating the position of the decoded pixel for generation of the reference pixel necessary for prediction (step S1).

Then, the reference pixel generation unit 302 performs, for example, a process of storing the decoded pixel signal as an arrangement or filter processing performed on the decoded pixel based on the decoded pixel position information output by the block position identification unit 301 (step S2). Then, the intra-prediction signal generation unit 303 generates the intra-prediction signal based on the reference pixel signal output by the reference pixel generation unit 302, and the intra-prediction mode and the decoded pixel signal that are input separately, and outputs the intra-prediction signal (step S3).

Figure 5:
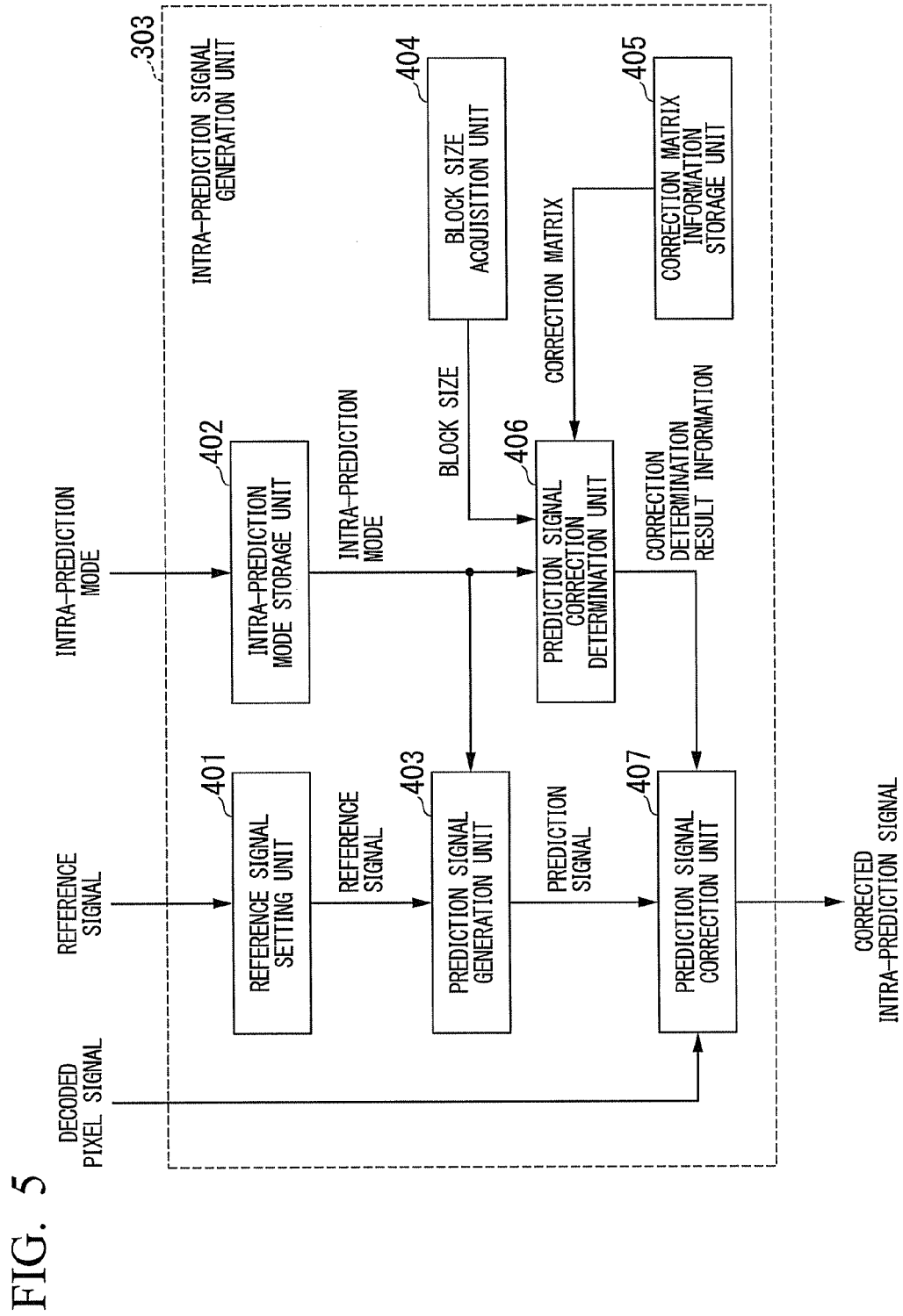
FIG. 5 is a block diagram showing a configuration of an intra-prediction signal generation unit 303 shown in FIG. 3.

Next, a configuration of the intra-prediction signal generation unit 303 shown in FIG. 3 will be described with reference to FIG. 5. FIG. 5 is a block diagram showing a configuration of the intra-prediction signal generation unit 303 shown in FIG. 3. The intra-prediction signal generation unit 303 includes a reference signal setting unit 401, an intra-prediction mode storage unit 402, a prediction signal generation unit 403, a block size acquisition unit 404, a correction matrix information storage unit 405, a prediction signal correction determination unit 406, and a prediction signal correction unit 407, as shown in FIG. 5.

The reference signal setting unit 401 stores all values of reference pixels that are necessary when the prediction signal is generated, and sets each value in an arrangement of reference signals to be used in the prediction signal generation unit 403. The intra-prediction mode storage unit 402 stores a prediction mode of a block, and provides mode information for performing copying of the reference pixel in the prediction signal generation unit 403.

The prediction signal generation unit 403 generates the prediction signal in the intra-prediction mode according to the reference signal for being used for generation of the prediction signal given from the reference signal setting unit 401 and the intra-prediction mode given from the intra-prediction mode storage unit 402. The block size acquisition unit 404 acquires a size of the block that is a target in the intra-prediction. Information of this block size is provided to the prediction signal correction determination unit 406.

Figure 6:
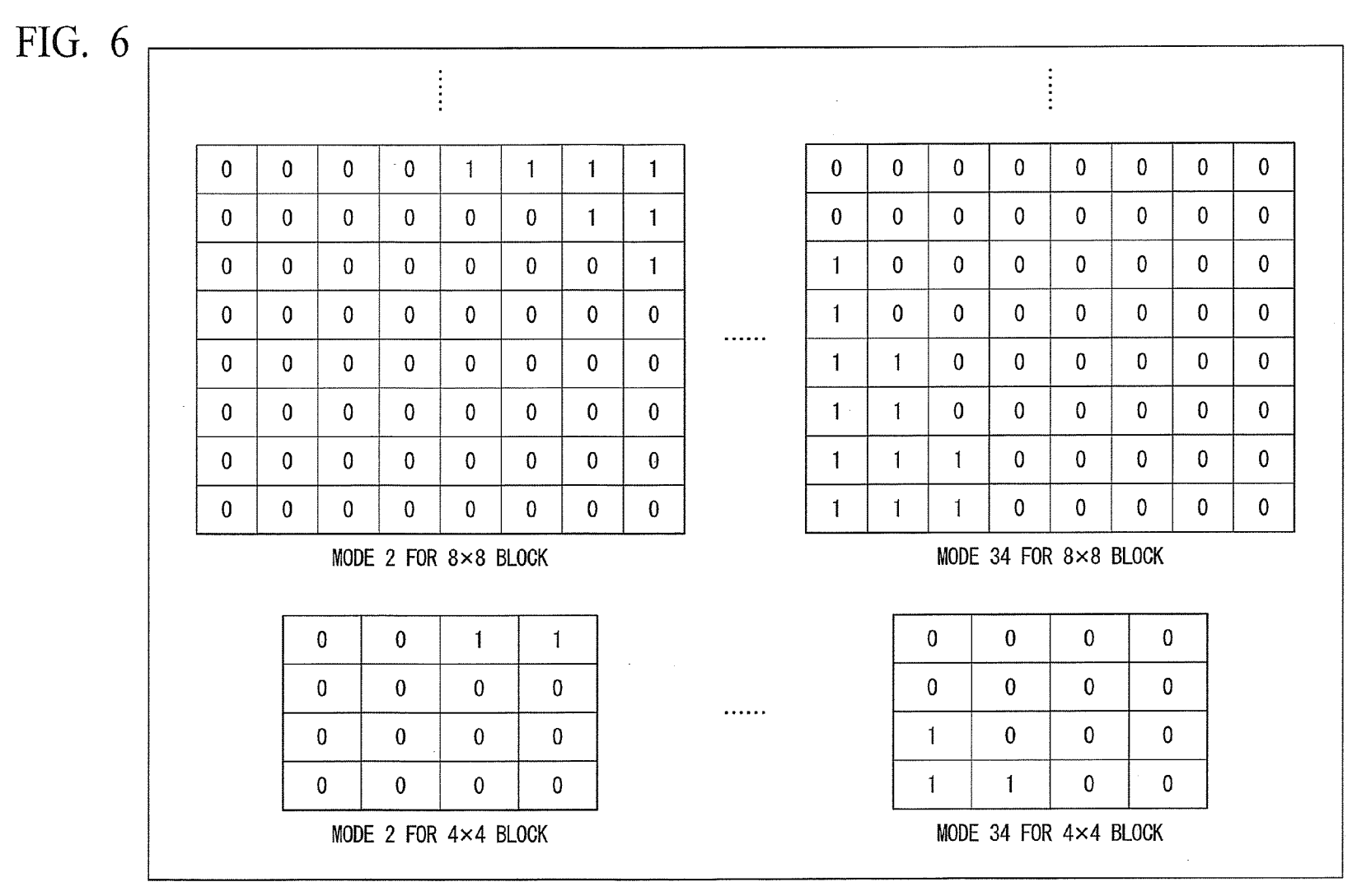

The correction matrix information storage unit 405 stores a matrix indicating the correction information corresponding to each prediction mode and each block size, and provides the correction matrix information to the prediction signal correction determination unit 406. FIG. 6 is a diagram showing an example of the correction matrix information. The correction matrix information is information in which a pixel position that is a correction target is defined for each mode and each block size, as shown in FIG. 6. In FIG. 6, "1" indicates the correction target pixel, and "0" indicates a pixel other than the correction target.

The prediction signal correction determination unit 406 receives the intra-prediction mode information output from the intra-prediction mode storage unit 402, the block size information output from the block size acquisition unit 404, and the correction matrix information output from the correction matrix information storage unit 405, and selects the correction matrix information corresponding to the prediction mode and the block size with respect to the prediction signal generated in the prediction mode. Also, the prediction signal correction determination unit 406 outputs the selected correction matrix information as correction determination result information.

The prediction signal correction unit 407 receives the prediction signal output by the prediction signal generation unit 403, the correction determination result information output by the prediction signal correction determination unit 406, and the decoded pixel signal. The prediction signal correction unit 407 corrects the prediction signal based on the correction determination result information and outputs the corrected intra-prediction signal. Here, if the correction determination result indicates no correction, the prediction signal correction unit 407 merely outputs the input prediction signal without performing, for example, changing.

Figure 7:
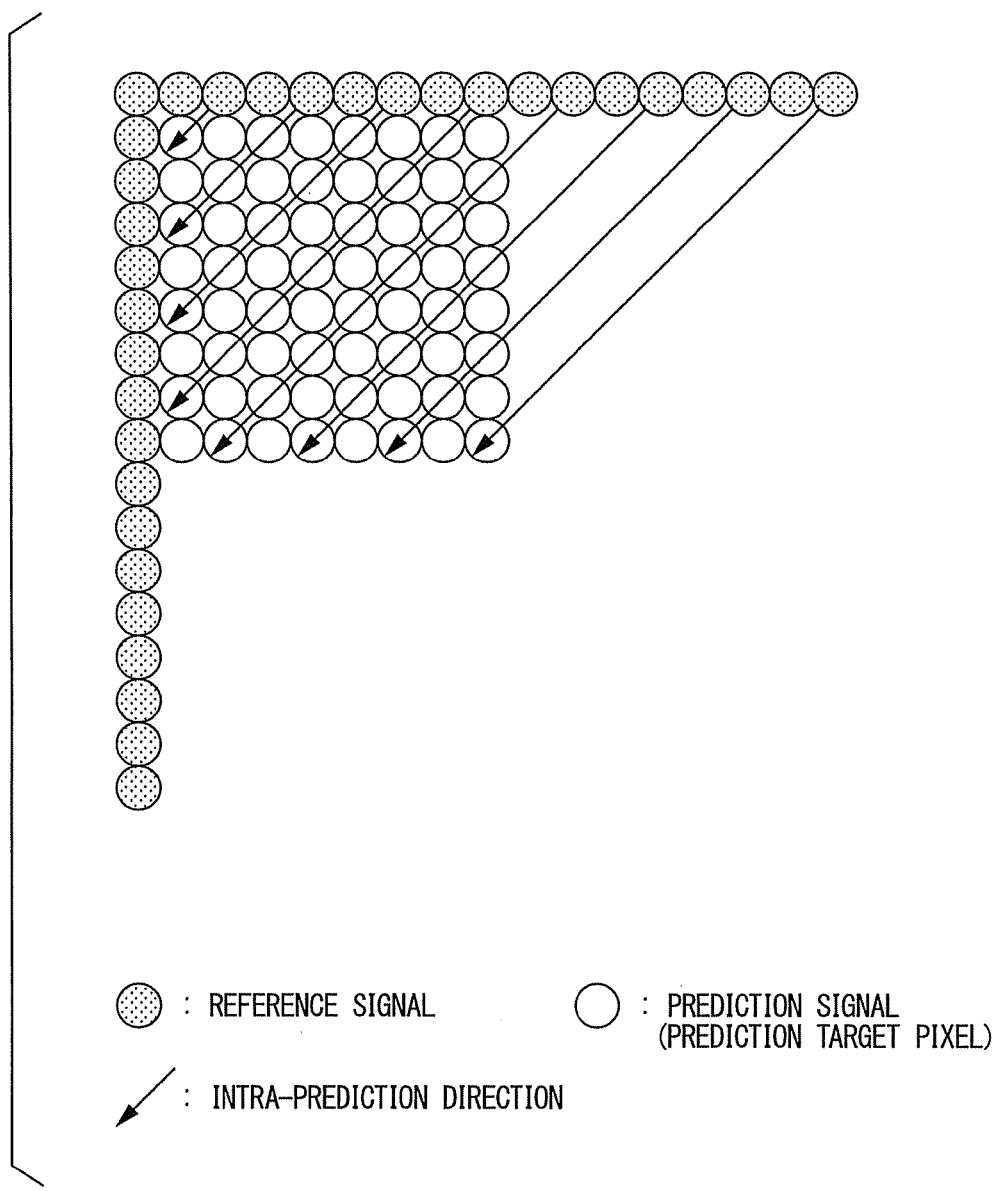
FIG. 7 is a diagram showing an example in which a block size is 8×8, and mode 34 (a mode in which prediction is performed at 45° from an upper right to a lower left) is selected.
Figure 8:
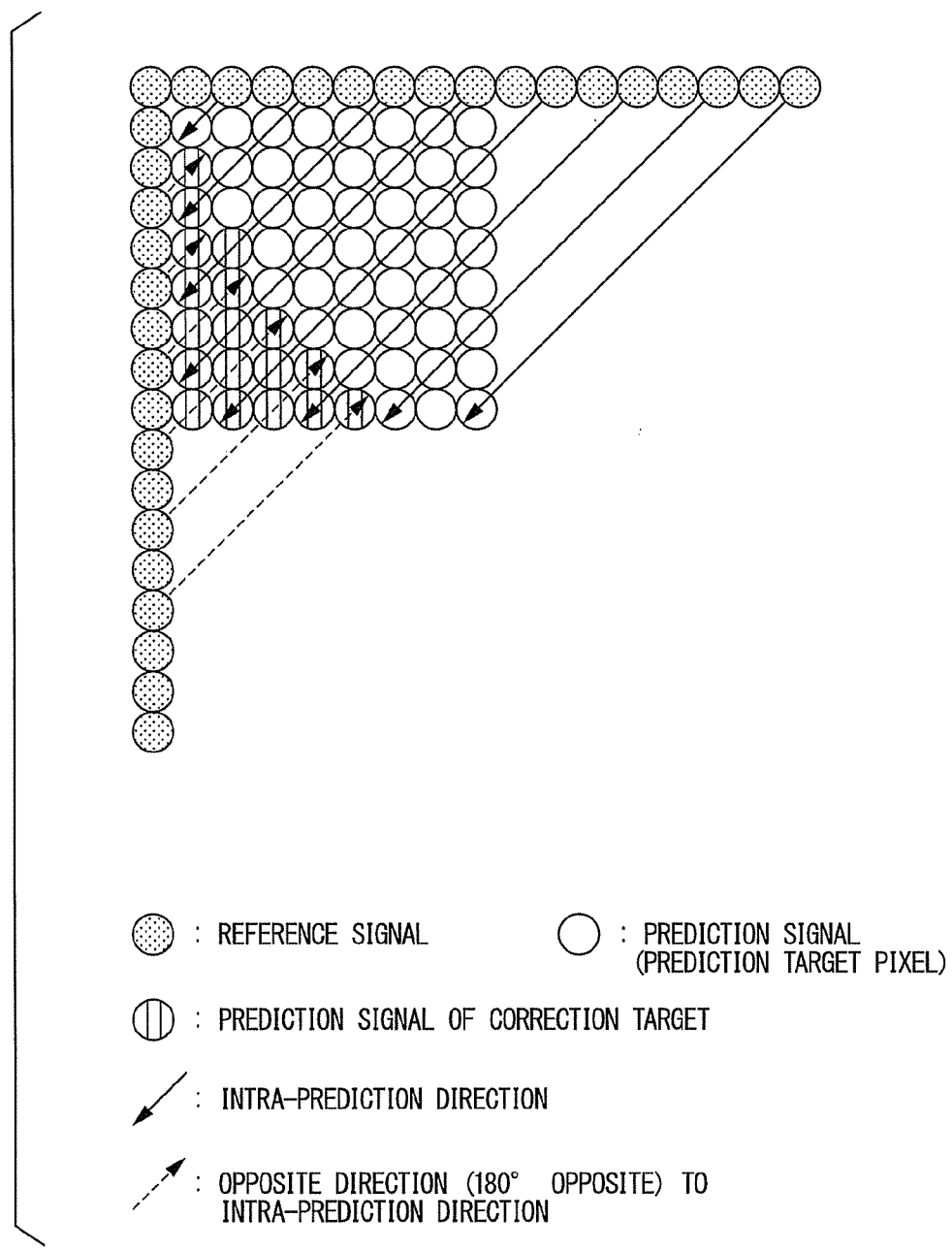
FIG. 8 is a diagram showing an example in which a block size is 8×8, and mode 34 (a mode in which prediction is performed at 45° from an upper right to a lower left) is selected.

FIGS. 7 and 8 are diagrams showing an example in which mode 34 (a mode in which prediction is performed at 45° from an upper right to a lower left) is selected when a block size is 8×8. In a conventional configuration, a signal generation method in which copying is performed without a value of the reference signal being changed in a prediction direction is used, as shown in FIG. 7. On the other hand, in the prediction according to this embodiment shown in FIG. 8, when the correction determination result information obtained from the prediction signal correction determination unit 406 is correction matrix information (correction determination result information) shown in FIG. 9, a left reference signal having a short distance from the left decoded pixels, prediction target pixels, and the reference signal are used for a lower left portion of the prediction target block.

In the correction method in the prediction signal correction unit 407, for example, when the prediction signal after the correction is p(i, j), the prediction signal according to the prediction mode is p1($i, j$), and the prediction signal according to the prediction mode indicating a 180° opposite direction to the above prediction mode is p2($i, j$) (here, i is assumed to be a horizontal direction coordinate in the block, and j is assumed to be a vertical direction coordinate in the block), a numerical value of each coordinate described in the matrix is regarded as a weight coefficient w, and Equation (2) is used for generation. The weight coefficient is assumed to be w(i, j) since the weight coefficient varies with each position of the matrix (a position of the pixel in the block).

$$p(i,j)=(1-w(i,j)\times p1(i,j)+w(i,j)\times p2(i,j) \quad (2)$$

Here, while p2(i, j) is described as the prediction signal according to the prediction mode indicating the 180° opposite direction to this prediction mode, the present invention is not limited to the prediction mode of the 180° opposite direction. For example, various prediction signals in a planar prediction mode, a DC prediction mode, and an angular prediction mode in which a small angle is shifted from a 180° opposite direction can be applied as p2(i, j) as long as the prediction signals can be generated from a range of decoded pixels that can be acquired around the encoding target block.

Further, an example in which the weight coefficient rather than the correction target pixel is shown for the correction matrix information is shown in FIG. 10. This example is an example in which the weight coefficient is 1024, i.e., 100% weight. That is, the correction of the prediction signal is performed using the following Equation (2'). The weight coefficient is assumed to be w(i, j) since the weight coefficient varies with each position of the matrix (a position of the pixel in the block), similar to Equation (2).

$$p(i,j)=\{w(i,j) \times p1(i,j)+(1024-w(i,j)) \times p2(i,j)\}/1024 \qquad (2')$$

In the case of Equation (2), since a property of the corrected prediction signal suddenly changes inside the block, there is a possibility of a high frequency being generated and prediction error energy not being successfully reduced. On the other hand, when Equation (2') is used, the prediction signal can be gradually corrected, and thus the prediction error energy is successfully reduced and further improvement of coding efficiency is expected. Thus, the correction matrix information is not only information indicating a correction range, but also information indicating a ratio of correction, similar to the weight coefficient.

Further, it is not necessary for the correction matrix to be transmitted if a table that is common to the encoder and the decoder is stored in a memory or the like. A plurality of correction matrices are prepared for each prediction mode or each block size, and a number of the correction matrix providing a best rate distortion characteristic among the correction matrices may be encoded in units of frames, slices, or blocks, and transmitted. When the number indicating the correction matrix is transmitted, an overhead (a coding bit for transmission) is generated in each unit of switching, but the coding efficiency may be improved in comparison with a case in which the number is not transmitted since an optimal correction matrix can be adaptively selected.

The intra-prediction signal generation unit 303 in this embodiment includes the block size acquisition unit 404, the correction matrix information storage unit 405, the prediction signal correction determination unit 406, and the prediction signal correction unit 407, which is a characteristic not included in the related art.

Figure 11:
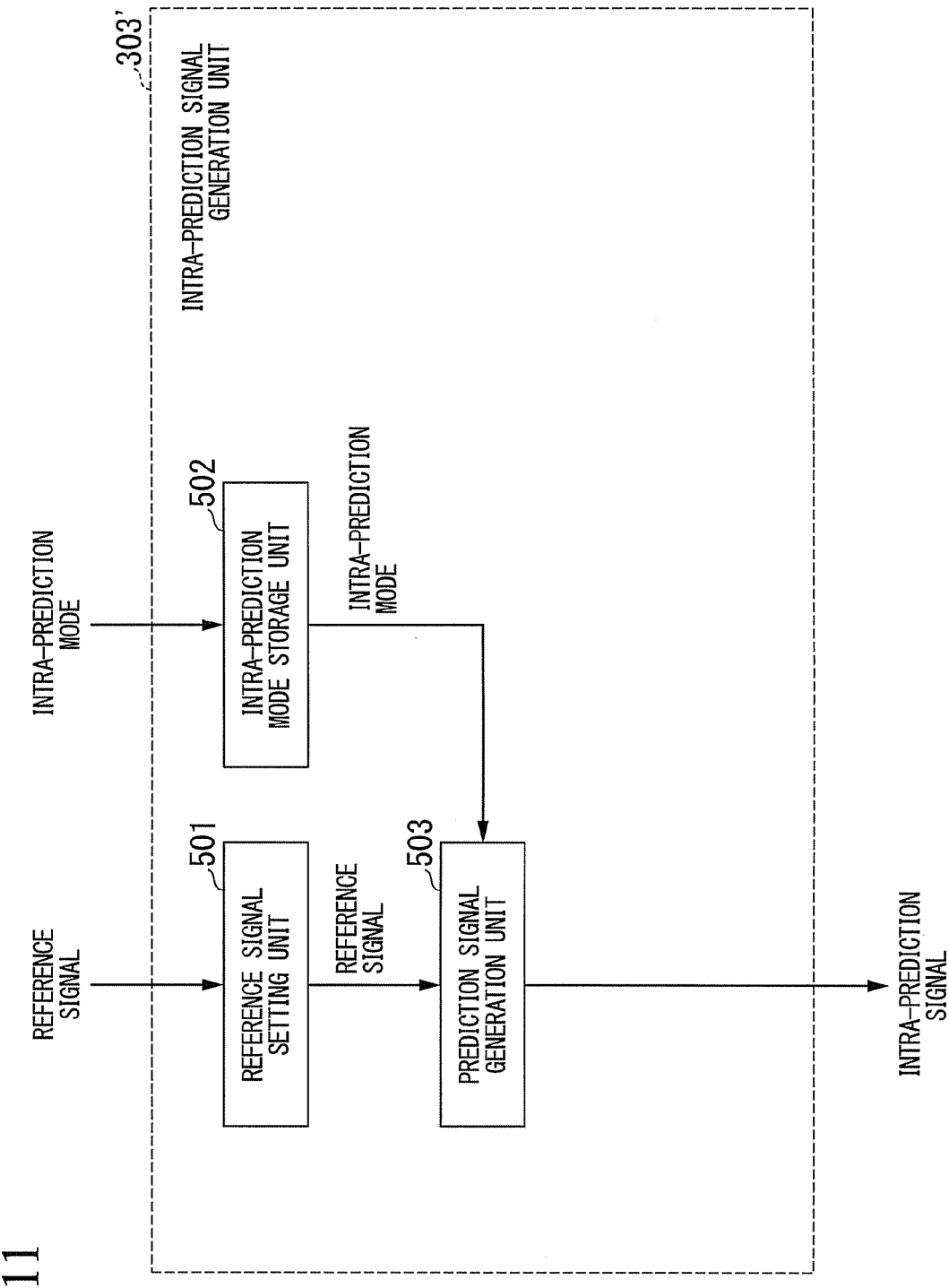
FIG. 11 is a block diagram showing a configuration of an intra-prediction signal generation unit according to the related art.

FIG. 11 is a block diagram showing a configuration of the intra-prediction signal generation unit 303' according to the related art. A reference signal setting unit 501, an intra-prediction mode storage unit 502, and a prediction signal generation unit 503 have the same functions as the reference signal setting unit 401, the intra-prediction mode storage unit 402, and the prediction signal generation unit 403 shown in FIG. 5. In FIG. 11, the block size acquisition unit 404, the correction matrix information storage unit 405, the prediction signal correction determination unit 406, and the prediction signal correction unit 407 in FIG. 5 are not included, and the intra-prediction signal output from the prediction signal generation unit 503 is merely output without being subjected to change such as correction.

Figure 12:
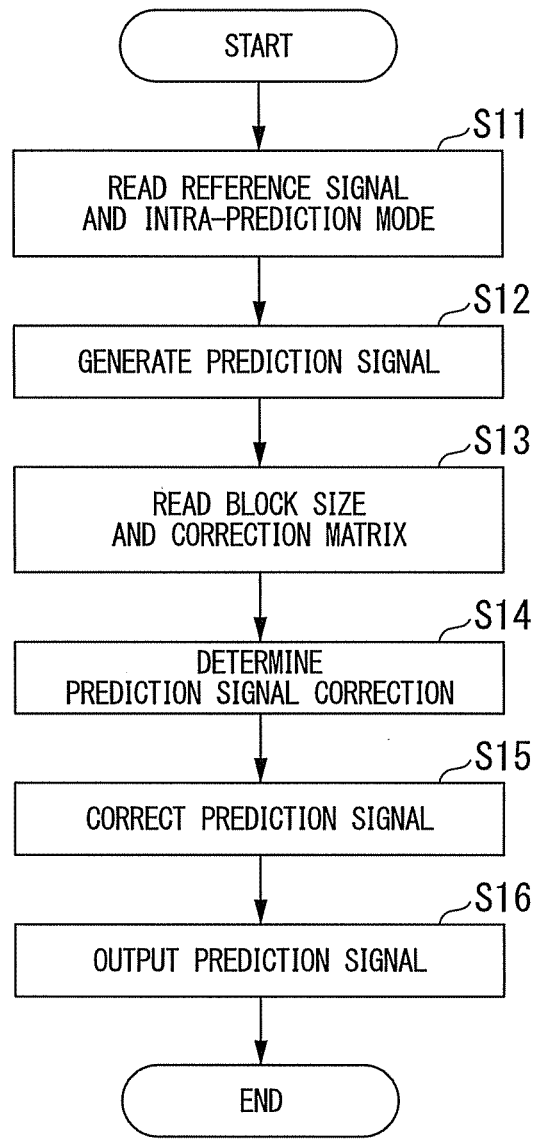
FIG. 12 is a flowchart showing an operation of an intra-prediction signal generation process performed by an intra-prediction signal generation unit 303 shown in FIG. 5.

Next, an operation of the intra-prediction signal generation unit 303 shown in FIG. 5 will be described with reference to FIG. 12. FIG. 12 is a flowchart showing an operation of an intra-prediction signal generation process performed by the intra-prediction signal generation unit 303 shown in FIG. 5.

When the intra-prediction signal generation process is started in the intra-prediction signal generation unit 303, the prediction signal generation unit 403 reads the reference signal stored in the reference signal setting unit 401, and reads the intra-prediction mode from the intra-prediction mode storage unit 402 (step S11). Also, the prediction signal generation unit 403 generates the prediction signal corresponding to the intra-prediction mode from the two types of read information (step S12).

Then, the prediction signal correction determination unit 406 reads the block size input from the block size acquisition unit 404 and the correction matrix information input from the correction matrix information storage unit 405 (step S13), and determines and selects the correction matrix information necessary for correction according to the intra-prediction mode read from the intra-prediction mode storage unit 402 (step S14). The correction matrix information is output to the prediction signal correction unit 407 as correction determination result information. The prediction signal correction unit 407 acquires an additional reference signal using the decoded pixel signal with respect to a result of the prediction signal correction determination unit 406 as necessary, generates the prediction signal in the 180° opposite direction to the intra-prediction mode, corrects the intra-prediction mode prediction signal using the prediction signal (step S15), and outputs a final prediction signal (step S16).

Second Embodiment

Figure 13:
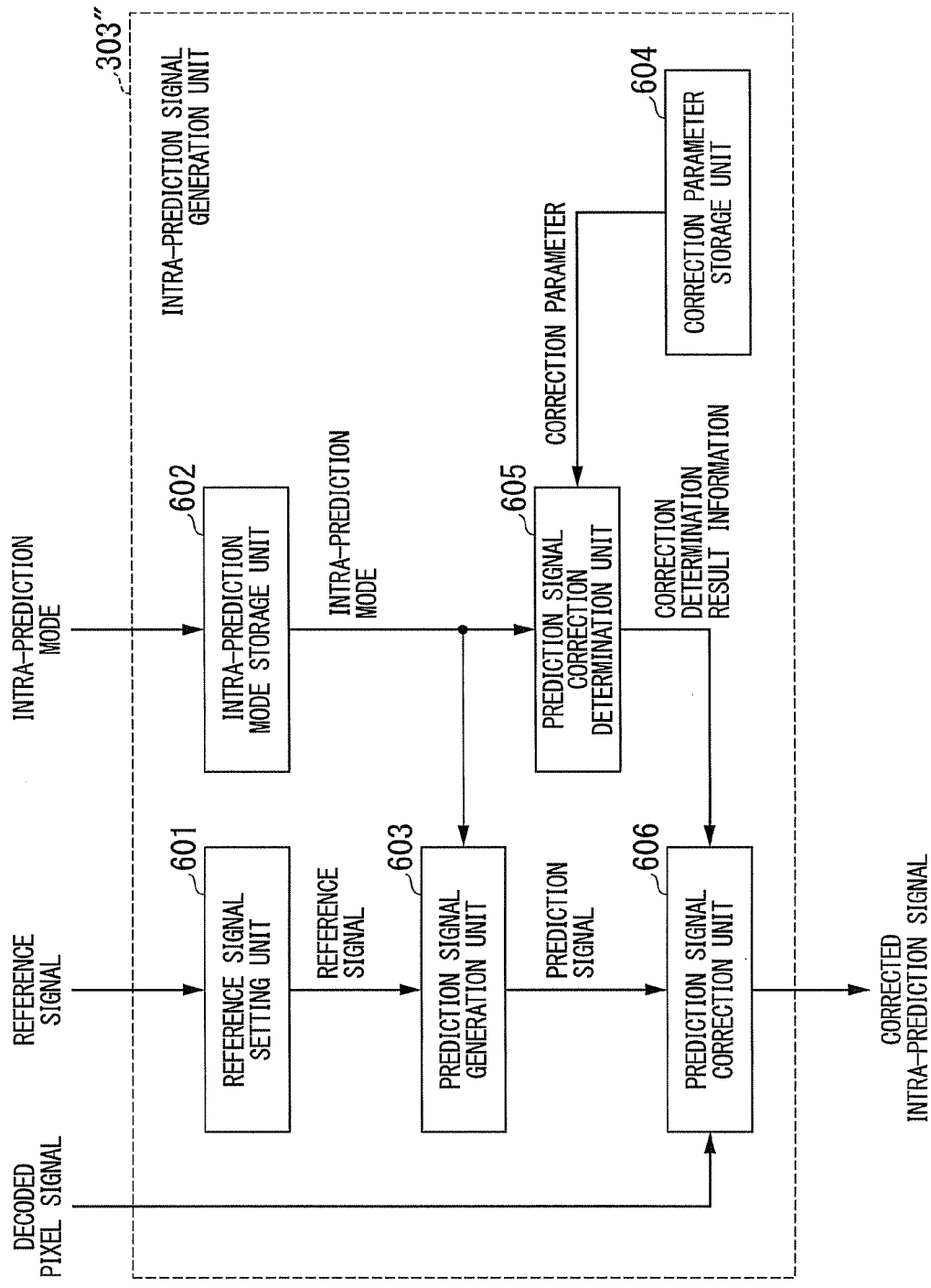
FIG. 13 is a block diagram showing a configuration of an intra-prediction signal generation unit in a second embodiment of the present invention.

Next, an image encoding apparatus and an image decoding apparatus according to a second embodiment of the present invention will be described. Since the second embodiment is different from the first embodiment only in the intra-prediction signal generation unit 303 and is the same as the first embodiment in a configuration and a processing operation of the other units, a description of the other units will be omitted. FIG. 13 is a block diagram showing a configuration of an intra-prediction signal generation unit 303" in the second embodiment. In FIG. 13, a reference signal setting unit 601, an intra-prediction mode storage unit 602, and a prediction signal generation unit 603 have the same configuration as the reference signal setting unit 401, the intra-prediction mode storage unit 402, and the prediction signal generation unit 403 shown in FIG. 5.

Figure 14:
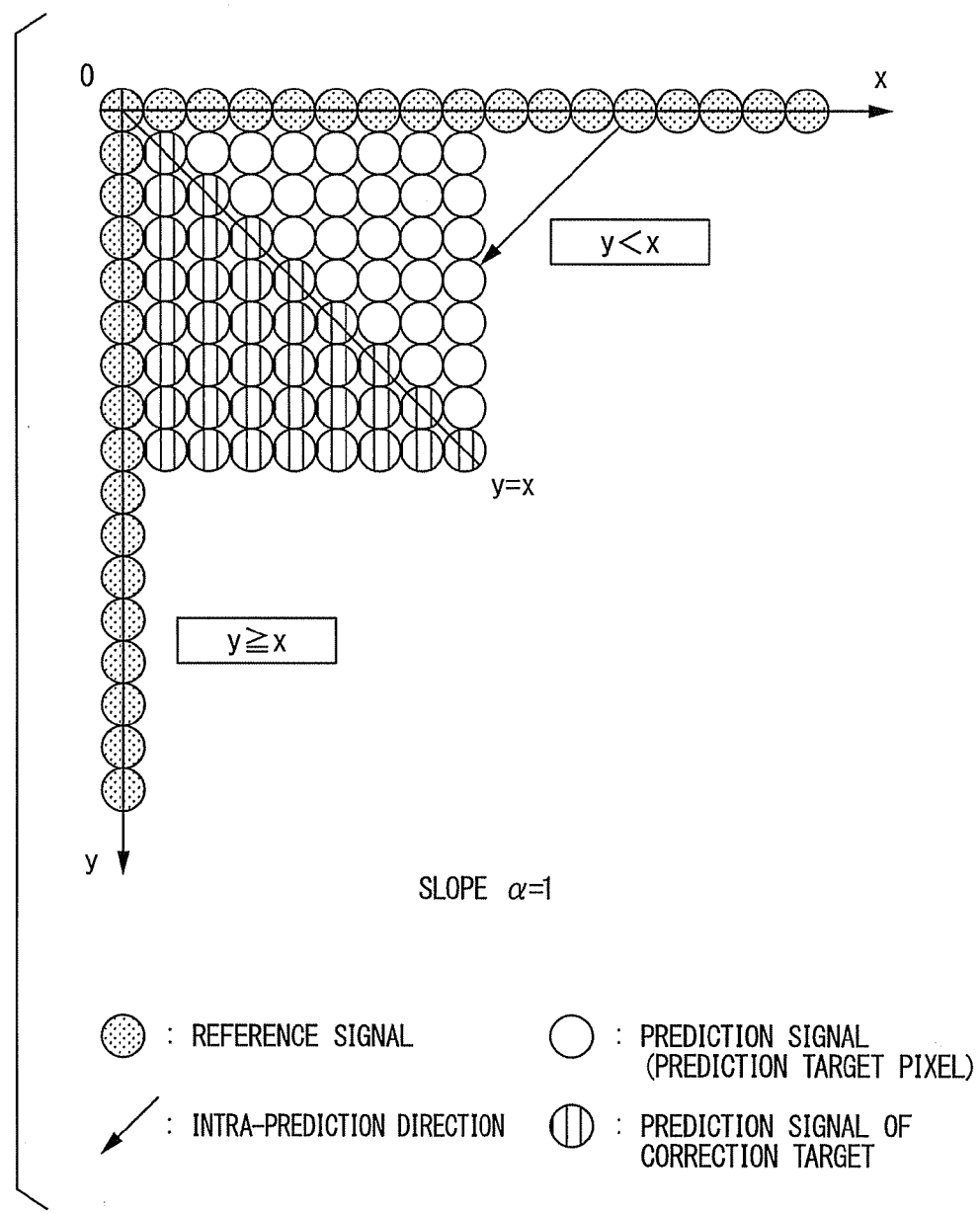
FIG. 14 is an illustrative diagram showing an example of an intra-prediction signal correction process.
Figure 15:
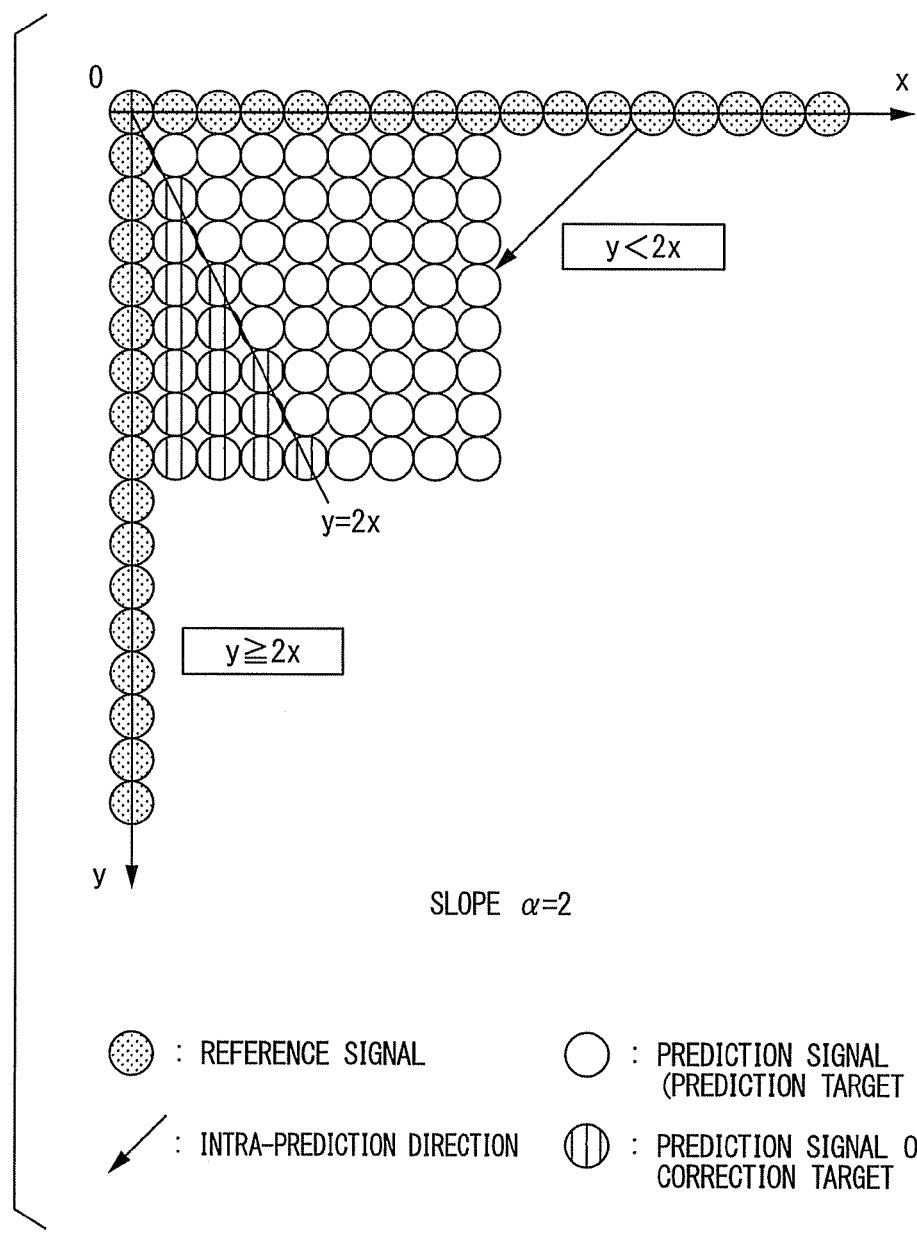
FIG. 15 is an illustrative diagram showing an example of an intra-prediction signal correction process.

A correction parameter storage unit 604 holds a parameter necessary for correction in a memory or the like. FIGS. 14 and 15 are diagrams showing an example of an intra-prediction signal correction process. When a coordinate of the reference pixel located on the upper left side of the prediction target block is used as an origin, a horizontal direction is positive to the right and a vertical direction is positive downward as shown in FIGS. 14 and 15, a range in which the correction is performed within a prediction target block is determined according to the following definitions.

y≥αx: correction target pixel y<αx: pixel that is not the correction target

The slope α in this case is defined as the correction parameter. This correction parameter has a value that is common to an encoder and a decoder. The correction parameter can be separately encoded and transmitted in units of sequences or frames, and can be decoded and acquired on the decoding side. The correction parameter storage unit 604 outputs the correction parameter a to a prediction signal correction determination unit 605. The correction parameter a may be defined for each block size or may have a value that is common to the block sizes. The correction parameter a can be defined for each prediction mode or may have the same value for all prediction modes.

The prediction signal correction determination unit 605 receives the intra-prediction mode output from the intra-prediction mode storage unit 602 and the correction parameter a output from the correction parameter storage unit 604, determines a correction range for the prediction signal generated in the intra-prediction mode, and outputs a correction determination result to the prediction signal correction unit 606.

The prediction signal correction unit 606 receives the prediction signal output by the prediction signal generation unit 603, the correction determination result information output by the prediction signal correction determination unit 605, and the decoded pixel signal. The prediction signal correction unit 606 corrects the prediction signal based on the correction determination result information and outputs the corrected intra-prediction signal. Here, if the correction determination result indicates no correction, the prediction signal correction unit 606 merely outputs the input prediction signal without performing, for example, changing.

In the correction method in the prediction signal correction unit 606, for example, when the prediction signal after the correction is p(i, j), the prediction signal according to the prediction mode is p1(i, j), and the prediction signal according to the prediction mode indicating a 180° opposite direction to the above prediction mode is p2(i, j) (here, i is assumed to be a horizontal direction coordinate in the block, and j is assumed to be a vertical direction coordinate in the block), a weight coefficient w for each coordinate is defined as w=0 if y≥αx and as w=1 if y<αx, and Equation (3) is obtained.

$$p(i,j)=(1-w) \times p1(i,j)+w \times p2(i,j) \quad (3)$$

Here, while p2(i, j) is described as the prediction signal according to the prediction mode indicating the 180° opposite direction to the prediction mode, the present invention is not limited to the prediction mode of the 180° opposite direction. For example, various prediction signals of a planar prediction mode, a DC prediction mode, and an angular prediction mode in which a small angle is shifted from a 180° opposite direction can be applied as p2(i, j) as long as the prediction signals can be generated from a range of decoded pixels that can be acquired around the encoding target block.

Figure 16:
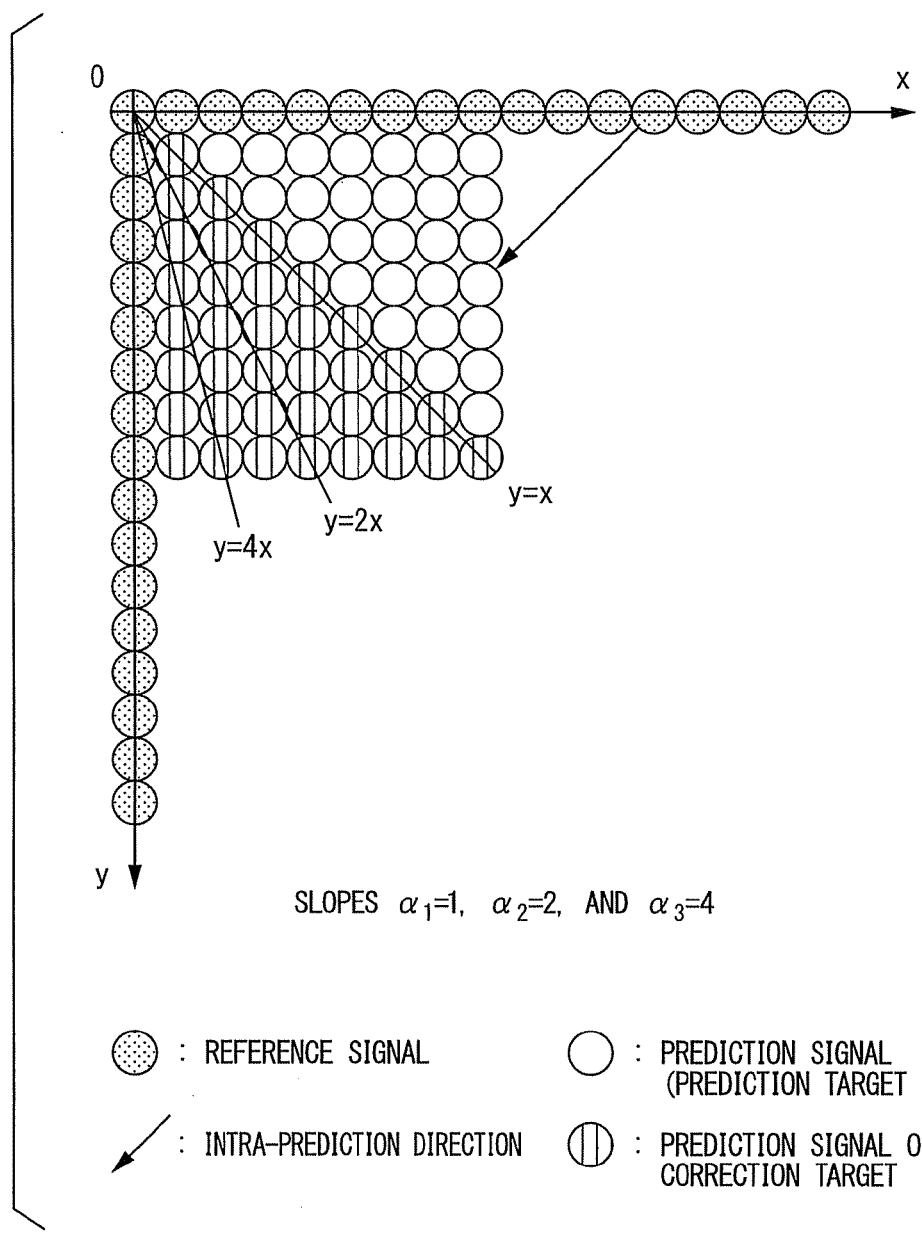
FIG. 16 is an illustrative diagram showing an example of an intra-prediction signal correction process.

While a description when the correction parameter is assumed to be single has been given, a plurality of correction parameters such as α1, α2, . . . , αn (n≥2) can be prepared and the prediction signal can be corrected. FIG. 16 is a diagram showing an example in which a plurality of correction parameters are prepared and the prediction signal is corrected. For example, when the plurality of correction parameters are prepared and the prediction signal is corrected, the following (i) to (iv) are performed.

(i) When y<x, w=0 is applied to Equation (3).

$$p(i,j)=p1(i,j)$$

(ii) When y≥x and y<2x, w=0.05 is applied to Equation (3).

$$p(i,j)=0.95 \times p1(i,j)+0.05 \times p2(i,j)$$

(iii) When y≥2x and y<4x, w=0.1 is applied to Equation (3).

$$p(i,j)=0.9 \times p1(i,j)+0.1 \times p2(i,j)$$

(iv) When y≥4, w=0.2 is applied to Equation (3).

$$p(i,j)=0.8 \times p1(i,j)+0.2 \times p2(i,j)$$

In the example shown in FIG. 16, three types of correction parameters are introduced, and the weight coefficient is changed in four regions inside the block, such that a more flexibly weighted prediction signal can be generated. The various correction parameters and the weight coefficient may be defined as being common to the encoder and the decoder. Alternatively, a set thereof can be encoded by the encoder and transmitted to the decoder, and can be decoded by and applied to the decoder. When the set is transmitted without being encoded, no overhead is generated, but improvement of encoding performance is limited due to application of the same set to all frames. On the other hand, when the set is transmitted after being encoded, the overhead is generated in each unit of switching (for example, frames, slices, or blocks), but great improvement of the encoding performance is expected in comparison with a case in which there is no transmission since adaptive correction of the prediction signal can be performed.

In the above description, while a correction border line is assumed to be a linear function (y=αx), a quadratic function (y=αx$_2$), an exponential function (y=αe$_x$), or a logarithmic function (y=α log$_2$x) can be used. Further, an offset term β may be defined, a border may be set as in y=αx+β, y=αx$_2$+β, y=αe$_x$+β, or y=α log$_2$x, and the offset β may be included in the correction parameter. That is, parameter groups which indicate the shape of the border line are all assumed to be correction parameters.

Figure 17:
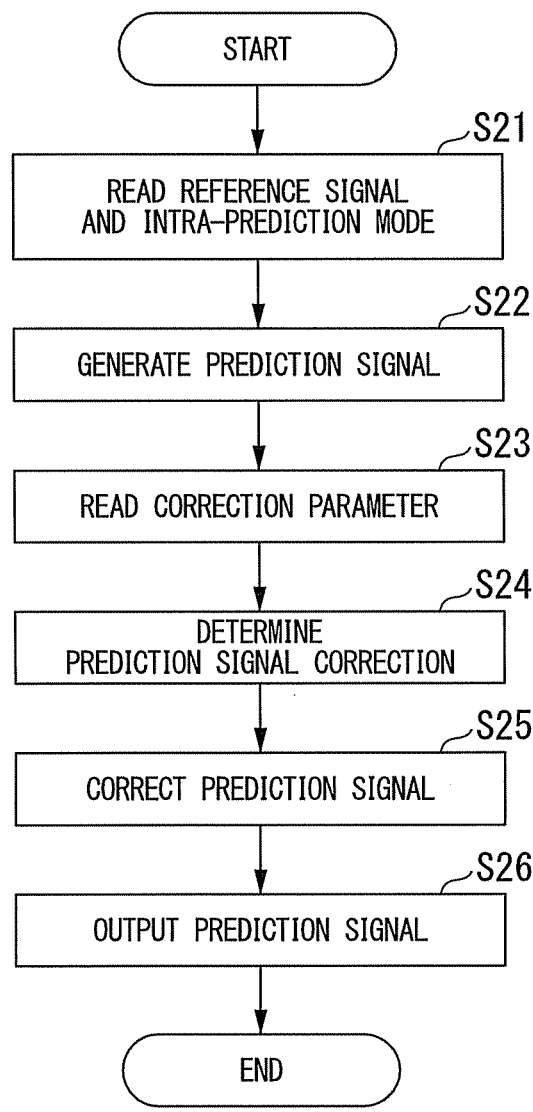
FIG. 17 is a flowchart showing an operation of an intra-prediction signal generation process performed by an intra-prediction signal generation unit 303" shown in FIG. 13.

Next, an operation of the intra-prediction signal generation unit 303" shown in FIG. 13 will be described with reference to FIG. 17. FIG. 17 is a flowchart showing an operation of an intra-prediction signal generation process performed by the intra-prediction signal generation unit 303" shown in FIG. 13.

When the intra-prediction signal generation process is started in the intra-prediction signal generation unit 303", the prediction signal generation unit 603 reads the reference signal stored in the reference signal setting unit 601, and reads the intra-prediction mode from the intra-prediction mode storage unit 602 (step S21). The prediction signal generation unit 603 generates the prediction signal corresponding to the intra-prediction mode from the two types of read information (step S22).

Then, the prediction signal correction determination unit 605 reads the correction parameter input from the correction parameter storage unit 604 (step S23) and determines a region and a weight coefficient necessary for correction according to the intra-prediction mode read from the intra-prediction mode storage unit 602 (step S24). This information is output to the prediction signal correction unit 606 as the correction determination result information, and the prediction signal correction unit 606 acquires an additional reference signal using the decoded pixel signal with respect to the result of the prediction signal correction determination unit 605, as necessary, generates a prediction signal in a 180° opposite direction to the intra-prediction mode, corrects the intra-prediction mode prediction signal using the prediction signal (step S25), and outputs a final prediction signal (step S26).

As described above, when a closer available reference signal can be used, the intra-prediction processing unit 101 generates an intra-prediction signal capable of further reducing the prediction residual energy by taking a component of such a reference signal in consideration of a distance between the prediction target pixel and the reference signal with respect to the generated prediction signal and the intra-prediction mode. For example, in the prediction mode in which the prediction is performed from upper right to lower left, a decoded pixel on the lower left side rather than upper right side is used as the reference pixel used for generation of a prediction signal in a position away from the reference pixel, that is, a prediction signal of a lower left portion of the prediction target block, such that prediction residual energy can be reduced. Accordingly, it is possible to perform flexible generation of the prediction signal in each prediction position that cannot be supported in the related art. As a result, it is possible to achieve improvement of coding efficiency due to the prediction residual energy reduction.

The image encoding apparatus 100 including the intra-prediction processing units 101 and 202 and the intra-prediction processing unit 101, and the image decoding apparatus 200 including the intra-prediction processing unit 202 described above in the first and second embodiments can be realized using a computer and a software program.

Figure 18:
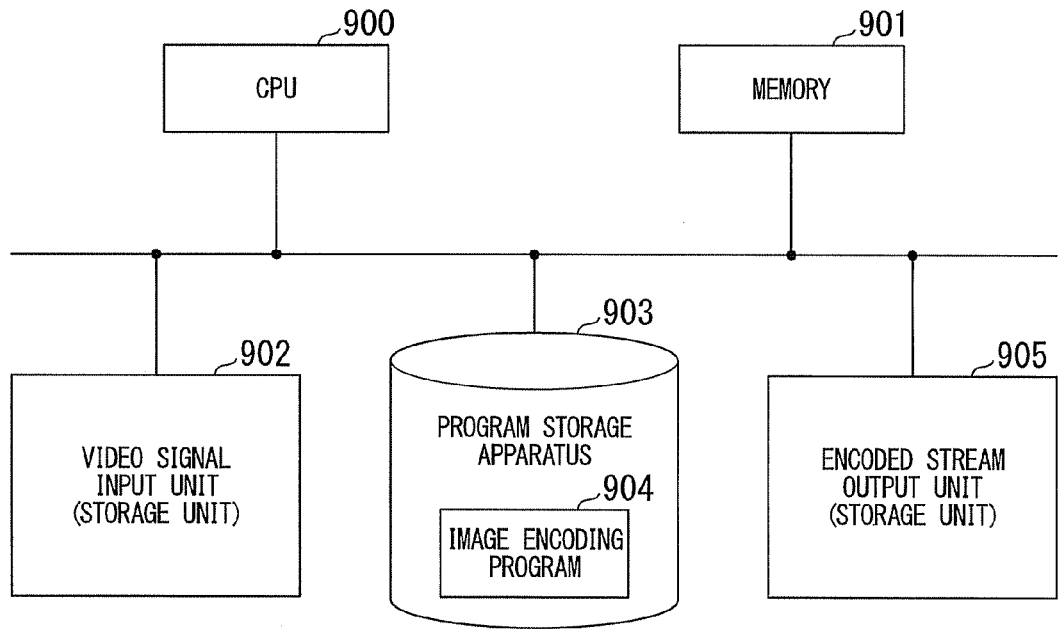
FIG. 18 is a diagram showing a hardware configuration when an image encoding apparatus includes a computer and a software program.

FIG. 18 is a diagram showing a hardware configuration example of a computer when the image encoding apparatus 100 including the intra-prediction processing unit 101 includes the computer and a software program. The computer includes a CPU 900, a memory 901, a video signal input unit 902, a program storage apparatus 903, and an encoded-stream output unit 905.

The CPU 900 executes the program. The memory 901 is, for example, a RAM that temporarily stores a program or data accessed by the CPU 900. The video signal input unit 902 inputs an input video signal that is an encoding target from a device such as a camera that generates a video signal. Further, the video signal input unit 902 may be a storage device that stores an input video signal using a hard disk drive or the like. The program storage apparatus 903 stores an image encoding program 904 that is a software program that causes the CPU 900 to execute the encoding process described in each of the above-described embodiments. The encoded-stream output unit 905 outputs an encoded stream that is generated by the CPU 900 executing the image encoding program 904 loaded in the memory 901. The encoded-stream output unit 905 may output the encoded stream over a network. Further, the encoded-stream output unit 905 may be a storage device that stores the encoded stream using a hard disk drive or the like. The CPU 900, the memory 901, the video signal input unit 902, the program storage apparatus 903, and the encoded-stream output unit 905 are connected to each other via a bus.

Figure 19:
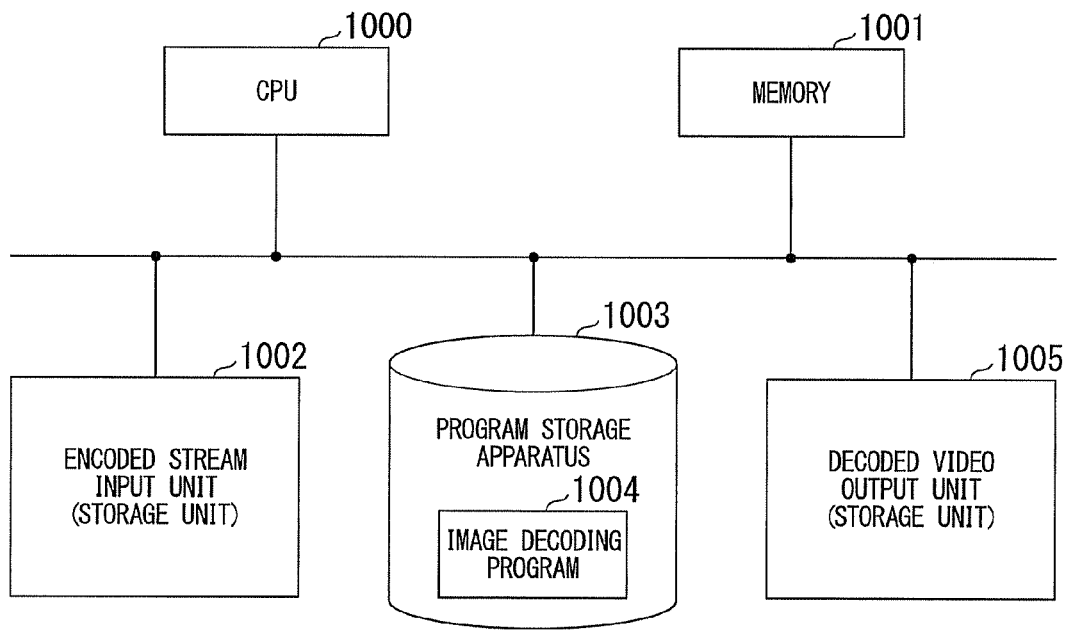
FIG. 19 is a diagram showing a hardware configuration when an image decoding apparatus includes a computer and a software program.
Figure 20:
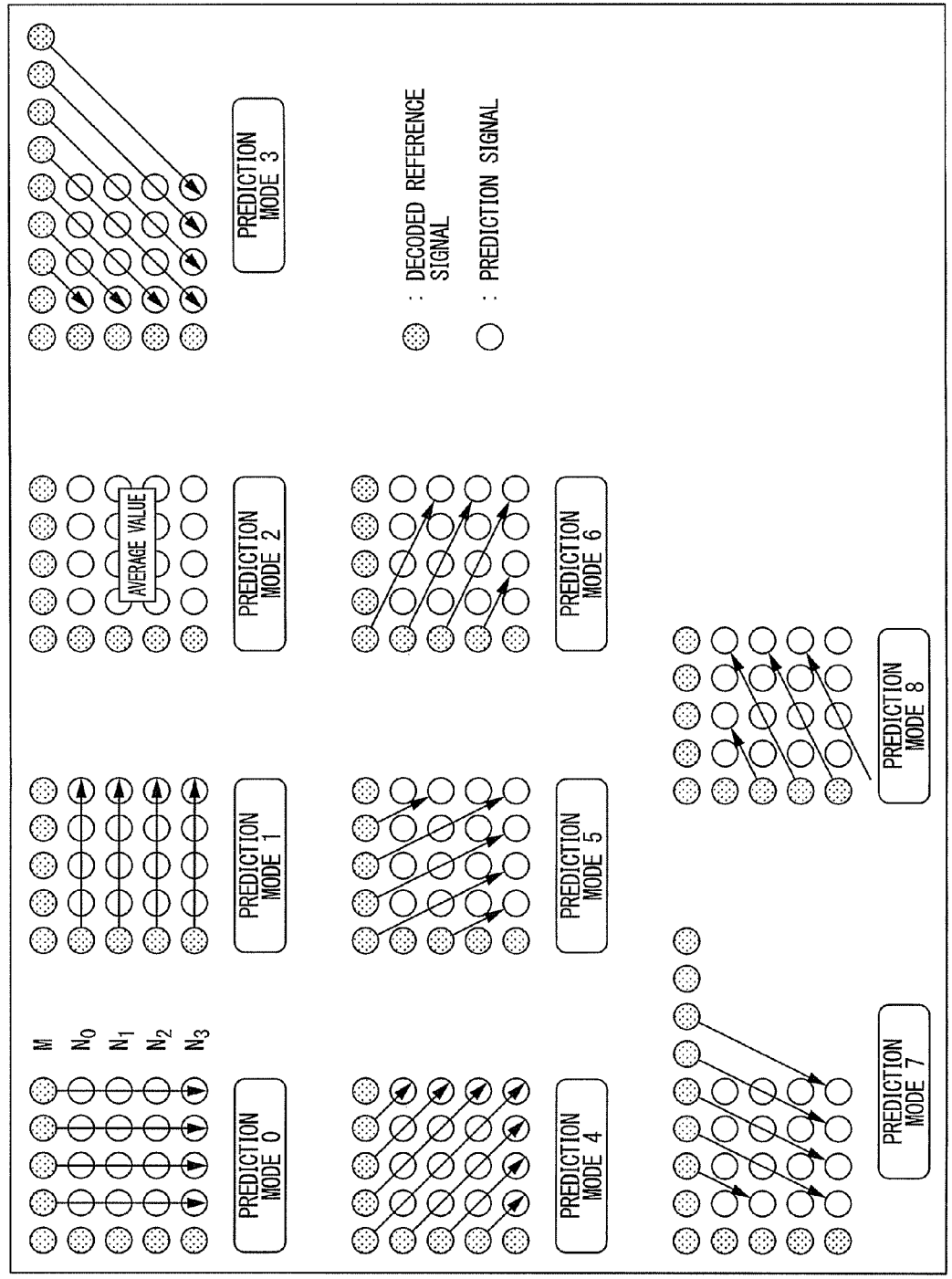
FIG. 20 is an illustrative diagram showing a prediction mode of a 4×4 block.
Figure 21:
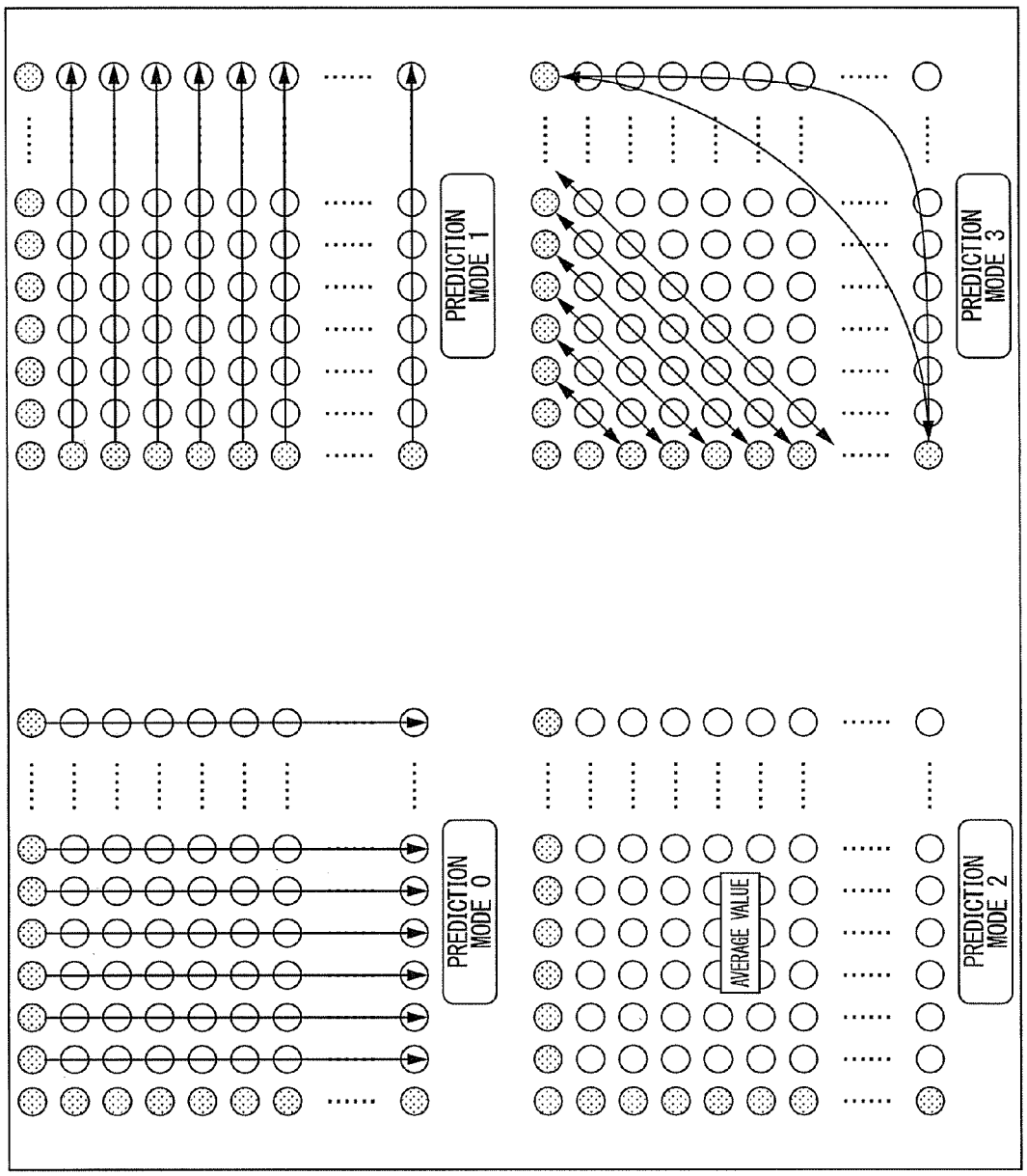
FIG. 21 is an illustrative diagram showing a prediction mode of a 16×16 block.
Figure 25:
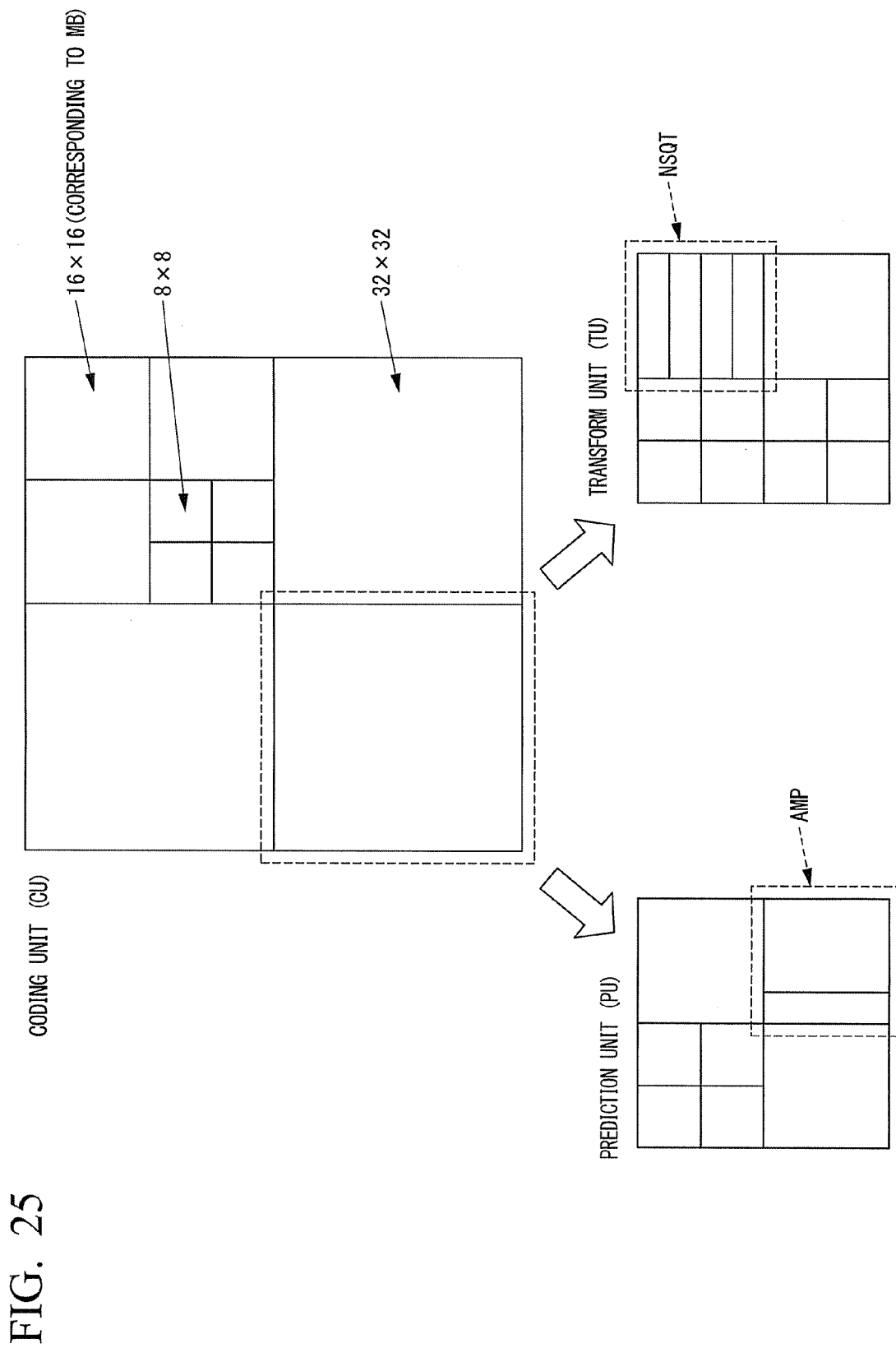
FIG. 25 is a diagram showing a definition of each processing unit in HEVC.
Figures 26, 27:
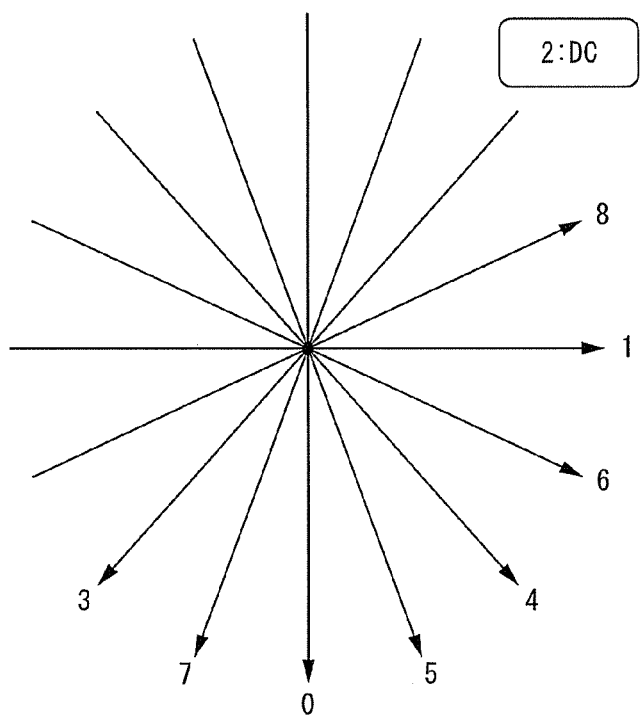
FIG. 26 is a diagram showing a correspondence relationship between an intra-prediction mode number and an intra-prediction mode in a prediction unit (common to all block sizes) of HEVC.
FIG. 27 is a diagram showing a direction of intra angular prediction.
Figure 28:
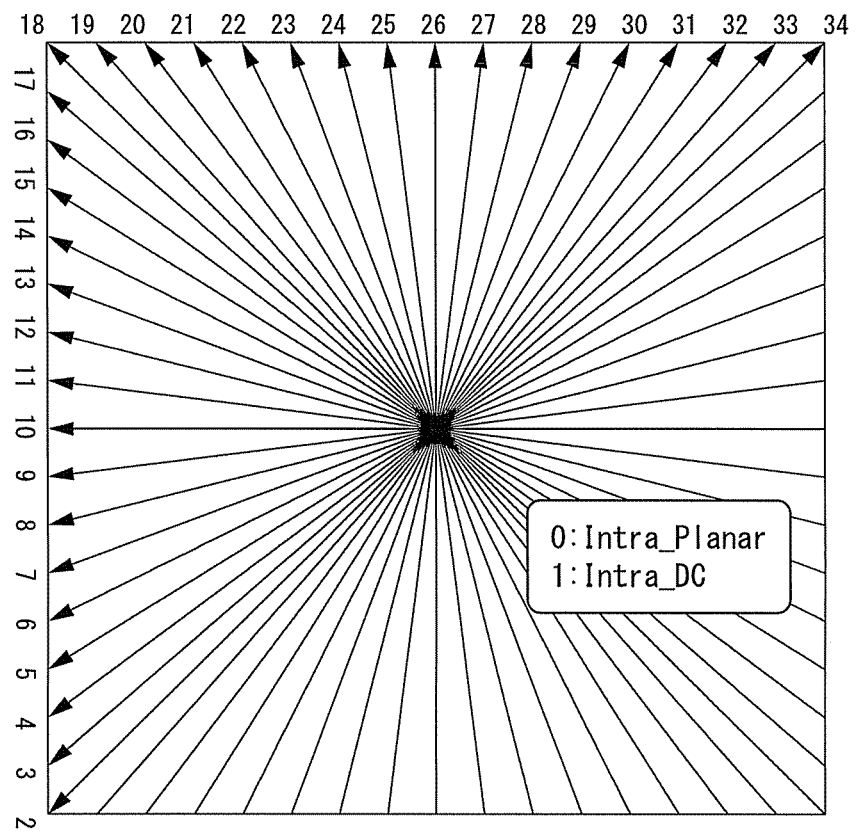
FIG. 28 is a diagram showing a direction of intra angular prediction.

FIG. 19 is a diagram showing a hardware configuration example of a computer when an image decoding apparatus 200 including the intra-prediction processing unit 202 includes the computer and a software program. The computer includes a CPU 1000, a memory 1001, an encoded stream input unit 1002, a program storage apparatus 1003, and a decoded video output unit 1005.

The CPU 1000 executes a program. The memory 1001 is, for example, a RAM that temporarily stores a program or data accessed by the CPU 1000. The encoded stream input unit 1002, for example, inputs the encoded stream obtained by the image encoding apparatus 100 encoding the input video signal through the above-described process. Further, the encoded stream input unit 1002 may be a storage device that stores the encoded stream using a hard disk drive or the like. The program storage apparatus 1003 stores an image decoding program 1004 that is a software program that causes the CPU 1000 to execute the decoding process described in each of the above-described embodiments. The decoded video output unit 1005 outputs the decoded video obtained by the CPU 1000 executing the image decoding program 1004 loaded in the memory 1001 and decoding the encoded stream, to a reproduction device or the like. Further, the decoded video output unit 1005 may be a storage device that stores the decoded video signal using a hard disk drive or the like. The CPU 1000, the memory 1001, the encoded stream input unit 1002, the program storage apparatus 1003, and the decoded video output unit 1005 are connected to each other via a bus.

Further, the "intra-prediction process" may be performed by recording a program for realizing the function of the intra-prediction processing unit in the present invention on a computer-readable recording medium, and causing a computer system to load and execute the program recorded in this recording medium. Further, "the computer system" referred to herein includes an OS or hardware such as a peripheral device. Further, the "computer system" also includes a WWW system including a homepage providing environment (or display environment). Further, the "computer-readable recording medium" includes a flexible disk, a magnetic optical disc, a ROM, a portable medium such as a CD-ROM, or a storage device such as a hard disk built in the computer system. Further, the "computer-readable recording medium" also includes a recording medium that holds a program for a certain time, such as a volatile memory (RAM) inside a computer system including a server and a client when a program is transmitted via a network such as the Internet or a communication line such as a telephone line.

Further, the above-described program may be transmitted from a computer system in which the program is stored in a storage device or the like to other computer systems via a transmission medium or by transmission waves in the transmission medium. Here, the "transmission medium" for transmitting the program refers to a medium having a function of transmitting information, such as a network (communication network) such as the Internet or a communication line such as a telephone line. Also, the above-described program may be a program for realizing some of the above-described functions. Alternatively, the program may be a program capable of realizing the above-described functions in combination with a program previously stored in a computer system, that is, a differential file (a differential program).

While the embodiments of the present invention have been described above with reference to the drawings, it should be understood that the embodiments are only examples of the present invention and the present invention is not limited to the embodiments. Additions, omissions, substitutions, and other corrections of the components may be performed without departing from the spirit or scope of the present invention.

INDUSTRIAL APPLICABILITY

The present invention is applicable to a use in which the subjective image quality and the coding efficiency should be necessarily improved using the closer decoded pixel in the intra-prediction process.

DESCRIPTION OF REFERENCE SIGNS

100: Image encoding apparatus
101: Intra-prediction processing unit

102: Inter-prediction processing unit
103: Prediction residual signal generation unit
104: Transform processing unit
105: Quantization processing unit
106: Inverse quantization processing unit
107: Inverse transform processing unit
108: Decoded signal generation unit
109: Frame memory
110: Deblocking filter processing unit
111: Inter-prediction information storage unit
112: Intra-prediction information storage unit
113: Entropy encoding processing unit
200: Image decoding apparatus
201: Entropy decoding processing unit
202: Intra-prediction processing unit
203: Inter-prediction processing unit
204: Inverse quantization processing unit
205: Inverse transform processing unit
206: Decoded signal generation unit
207: Frame memory
208: Deblocking filter processing unit
209: Inter-prediction information storage unit
210: Intra-prediction information storage unit
301: Block position identification unit
302: Reference pixel generation unit
303: Intra-prediction signal generation unit
401, 501, 601: Reference signal setting unit
402, 502, 602: Intra-prediction mode storage unit
403, 503, 603: Prediction signal generation unit
404: Block size acquisition unit
405: Correction matrix information storage unit
406, 605: Prediction signal correction determination unit
407, 606: Prediction signal generation unit
604: Correction parameter storage unit
900, 1000: CPU
901, 1001: Memory
902: Video signal input unit
903, 1003: Program storage apparatus
904: Image encoding program
905: Encoded stream output unit
1002: Encoded stream input unit
1004: Image decoding program
1005: Decoded video output unit

The invention claimed is:

1. An intra-prediction encoding method comprising:
setting a reference pixel signal from a decoded pixel signal in intra-prediction in which a prediction signal is generated in the same frame;
acquiring prediction mode identification information that identifies an intra-prediction mode;
generating a prediction signal based on the reference pixel signal and the prediction mode identification information;
selecting one of a plurality of correction matrix information stored in a storage, each of the plurality of correction matrix information including information that indicates whether correction is needed for a pixel that is a prediction target, the correction matrix information selected corresponding to the intra-prediction mode;
making, for each pixel as an unit, a determination regarding correction of the prediction signal on a basis of the correction matrix information selected;
correcting, according to a result of the determination, the generated prediction signal using another reference pixel having a shorter distance from the pixel that is the prediction target than a reference pixel that is used to generate the prediction signal; and,
reading the correction matrix information selected and determining a weight coefficient indicating a ratio at which the prediction target pixel is corrected based on the intra-prediction mode.

2. An intra-prediction decoding method comprising:
setting a reference pixel signal from a decoded pixel signal in intra-prediction in which a prediction signal is generated in the same frame;
acquiring prediction mode identification information that identifies an intra-prediction mode;
generating a prediction signal based on the reference pixel signal and the prediction mode identification information;
selecting one of a plurality of correction matrix information stored in a storage, each of the plurality of correction matrix information including information that indicates whether correction is needed for a pixel that is a prediction target, the correction matrix information selected corresponding to the intra-prediction mode;
making, for each pixel as an unit, a determination regarding correction of the prediction signal on a basis of the correction matrix information selected;
correcting, according to a result of the determination, the generated prediction signal using another reference pixel having a shorter distance from the pixel that is the prediction target than a reference pixel that is used to generate the prediction signal;
and reading the correction matrix information selected and determining a weight coefficient indicating a ratio at which the prediction target pixel is corrected based on the intra-prediction mode.

3. An intra-prediction encoding apparatus comprising:
a processor programmed to set a reference pixel signal from a decoded pixel signal in intra-prediction in which a prediction signal is generated in the same frame;
the processor being further programmed to acquire prediction mode identification information that identifies an intra-prediction mode;
the processor being further programmed to generate a prediction signal based on the reference pixel signal and the prediction mode identification information;
the processor being further programmed to select one of a plurality of correction matrix information stored in a storage, each of the plurality of correction matrix information including information that indicates whether correction is needed for a pixel that is a prediction target, the correction matrix information selected corresponding to the intra-prediction mode;
the processor being further programmed to make, for each pixel as an unit, a determination regarding correction of the prediction signal on a basis of the correction matrix information selected; and
the processor being further programmed to correct, according to a result of the determination, the generated prediction signal using another reference pixel having a short distance from the pixel that is the prediction target than a reference pixel that is used to generate the prediction signal;
wherein the processor is programmed to read the correction matrix information selected and to determine a weight coefficient indicating a ratio at which the prediction target pixel is corrected based on the intra-prediction mode.

4. The intra-prediction encoding apparatus according to claim 3, wherein the determination means encodes a number for identifying the correction information and transmits the number to a decoding side.

5. An intra-prediction decoding apparatus comprising:
a processor programmed to set a reference pixel signal from a decoded pixel signal in intra-prediction in which a prediction signal is generated in the same frame;
the processor being further programmed to acquire prediction mode identification information that identifies an intra-prediction mode;
the processor being further programmed to generate a prediction signal based on the reference pixel signal and the prediction mode identification information;
the processor programmed to select one of a plurality of correction matrix information stored in a storage, each of the plurality of correction matrix information including information that indicates whether correction is needed for a pixel that is a prediction target, the correction matrix information selected corresponding to the intra-prediction mode;
the processor being further programmed to make, for each pixel as an unit, a determination regarding correction of the prediction signal on a basis of the correction matrix information selected;
the processor being further programmed to correct, according to a result of the determination, the generated prediction signal using another reference pixel having a shorter distance from the pixel that is the prediction target than a reference pixel that is used to generate the prediction signal;
wherein the processor is programmed to read the correction matrix information selected and to determine a weight coefficient indicating a ratio at which the prediction target pixel is corrected based on the intra-prediction mode.

6. The intra-prediction decoding apparatus according to claim 5, wherein the determination means decodes a number for identifying the correction information and restores the correction information.

7. A non-transitory computer-readable recording medium having an intra-prediction encoding program for causing a computer to execute the intra-prediction encoding method according to claim 1.

8. A non-transitory computer-readable recording medium having an intra-prediction decoding program for causing a computer to execute the intra-prediction decoding method according to claim 2.

* * * * *